(12) United States Patent
Naik et al.

(10) Patent No.: US 8,626,967 B1
(45) Date of Patent: Jan. 7, 2014

(54) VIRTUALIZATION OF A STORAGE PROCESSOR FOR PORT FAILOVER

(75) Inventors: Dilesh Naik, Shrewsbury, MA (US); Shuyu Lee, Acton, MA (US); Matthew Long, Uxbridge, MA (US); Anoop George Ninan, Milford, MA (US); Daniel B. Lewis, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/538,056

(22) Filed: Jun. 29, 2012

(51) Int. Cl.
G06F 13/14 (2006.01)

(52) U.S. Cl.
USPC .................................. 710/38; 710/31; 710/74

(58) Field of Classification Search
None
See application file for complete search history.

(56) References Cited

U.S. PATENT DOCUMENTS

| | | | |
|---|---|---|---|
| 6,578,158 B1 * | 6/2003 | Deitz et al. ........................ 714/11 |
| 6,888,792 B2 * | 5/2005 | Gronke ........................... 370/227 |
| 7,039,828 B1 * | 5/2006 | Scott ............................. 714/4.11 |
| 7,203,730 B1 * | 4/2007 | Meyer et al. .................... 709/213 |
| 7,447,197 B2 * | 11/2008 | Terrell et al. ................... 370/360 |
| 7,467,191 B1 * | 12/2008 | Wang et al. ..................... 709/221 |
| 7,512,832 B1 * | 3/2009 | Lent et al. ..................... 714/4.11 |
| 7,586,842 B2 * | 9/2009 | McGee et al. .................. 370/218 |
| 7,734,712 B1 * | 6/2010 | Meyer et al. .................... 709/213 |
| 7,734,947 B1 * | 6/2010 | Frangioso et al. .............. 714/4.1 |
| 7,783,788 B1 * | 8/2010 | Quinn et al. ....................... 710/8 |
| 7,818,408 B1 * | 10/2010 | Ignatuk et al. ................. 709/221 |
| 7,949,893 B1 * | 5/2011 | Knaus et al. .................... 714/4.1 |
| 8,031,731 B2 * | 10/2011 | Yu et al. ......................... 370/419 |
| 8,156,561 B2 * | 4/2012 | Mimatsu et al. ................. 726/26 |
| 8,321,722 B2 * | 11/2012 | Tanaka et al. ................... 714/6.3 |
| 8,397,001 B2 * | 3/2013 | Martin et al. .................... 710/38 |
| 8,397,092 B2 * | 3/2013 | Karnowski ..................... 713/324 |
| 2006/0117212 A1 * | 6/2006 | Meyer et al. ....................... 714/4 |
| 2007/0070975 A1 * | 3/2007 | Otani et al. ..................... 370/351 |
| 2007/0239944 A1 * | 10/2007 | Rupanagunta et al. ......... 711/147 |
| 2009/0228651 A1 * | 9/2009 | Sharma et al. ................. 711/114 |
| 2010/0107000 A1 * | 4/2010 | Wakelin ............................ 714/4 |
| 2013/0080559 A1 * | 3/2013 | Rao et al. ....................... 709/208 |

OTHER PUBLICATIONS

Ninan, Anoop George, "Port Matching for Data Storage System Port Failover", U.S. Appl. No. 13/538,111, filed Jun. 29, 2012.
Naik, Dilesh, et al., "Coordinating Processing for Request Redirection", U.S. Appl. No. 13/538,199, filed Jun. 29, 2012.
Long, Matthew, et al., "Managing a Port Failover in a Data Storage System", U.S. Appl. No. 13/431,264, filed Mar. 27, 2012.
Hitachi Data Systems, "Hitachi Adaptable Modular Storage 2000 Family", Oct. 2008.

* cited by examiner

*Primary Examiner* — Cheng-Yuan Tseng
(74) *Attorney, Agent, or Firm* — Muirhead and Saturnelli, LLC

(57) ABSTRACT

Described are techniques for processing requests. A request is received at a data storage system. The request is a command to perform first processing and the request is sent from a client over a virtualized path. The virtualized path includes a virtual target port of the data storage system. The virtual target port is a first physical target port that provides a virtualized counterpart port for a second physical target port whereby requests directed to the second physical target port are routed to the first physical target port rather than the second physical target port. First processing is performed and a response to the request is generated. The response includes first information consistent with sending the request over a non-virtualized path to the second physical target port. The response is sent to the client.

18 Claims, 29 Drawing Sheets

| PORT NAME | PORT ID | SWITCH PORT |
|---|---|---|
| apa | 0 | afa |
| apb | 1 | afb |

FIG. 4

VIRTUALIZATION OF A STORAGE PROCESSOR FOR PORT FAILOVER

TECHNICAL FIELD

The present invention relates to techniques used in connection with a port failover in a data storage system.

BACKGROUND OF THE INVENTION

It is known that new enterprise data centers store ever-larger amounts of critical data that must be immediately and continuously available. To ensure continued connectivity this may necessitate multiple paths between hosts and data storage arrays. For example, this may require multiple physical connections to two or more storage processors within a storage array. This may ensure continued connectivity to the storage array even if there is a failure of a single physical connection or a storage processor.

If an array comprises two or more storage processors it is known to include host-based failover software on the attached hosts to achieve port failover in the event of a failure of a single physical connection or a storage processor. However, this approach requires each attached host to have correctly configured failover software installed. This can be expensive and extremely inconvenient.

SUMMARY OF THE INVENTION

In accordance with one aspect of the invention is a method for processing requests comprising: receiving a request at a data storage system, wherein the request is a command to perform first processing and the request is sent from a client over a virtualized path, the virtualized path including a virtual target port of the data storage system, the virtual target port being a first physical target port that provides a virtualized counterpart port for a second physical target port whereby requests directed to the second physical target port are routed to the first physical target port rather than the second physical target port; performing the first processing and generating a response to the request, wherein the response includes first information consistent with sending the request over a non-virtualized path to the second physical target port; and sending the response to the client. The first processing may include determining a first data value that would be included in a generated response to the request if the request had alternatively been received by the second physical target port over a non-virtualized path. The response may include the first data value, and a generated response to the request may include a second data value different from the first data value when the request is received over a non-virtualized path including the first physical target port. A second request to perform the command may be sent from the client over a non-virtualized path including the first physical target port. The method may include sending, in response to the second request, a second response to the client, the second request including the second data value. The first physical target port may receive requests from the client directed to the first physical target port while also receiving requests directed to the second physical target port as a result of the first physical target port virtualizing the second physical target port. The second physical target port may be inoperative. The first physical target port may be associated with a first storage processor and the second physical target port may be associated with a second storage processor. The second storage processor may be inoperative. The first storage processor may virtualize the second storage processor. The first information may be consistent with the request being serviced by the second storage processor rather than the first storage processor. The first information may include first data characterizing the request as serviced by the second storage processor and may include second data characterizing the first storage processor as a peer processor of the second storage processor. The second data may indicate that the second storage processor is operative. The first information may identify the second physical target port, rather than the first physical port, as a port at which the request is received. The first physical target port may be associated with a first storage processor and the second physical target port may be associated with a second storage processor. The first information may identify the second storage processor as a storage processor associated with the port at which the request is received. The command may be an inquiry command that reports information about a target device and the first information of the response may identify the second physical target port as receiving the request and may identify a second storage processor associated with the second physical target port as servicing the request. The first physical target port may be associated with a first storage processor and the second physical target port may be associated with a second storage processor that is inoperative. The command may be a mode sense command reporting information about storage processor configuration of the data storage system, and the first information may identify the second storage processor as a target storage processor servicing the request and may identify the first storage processor as a peer storage processor of the second storage processor. The first physical target port may be associated with a first storage processor and the second physical target port may be associated with a second storage processor that is inoperative. The command may report target port group information representing a state of a target device on each of the first storage processor and the second storage processor, the first information including a first target port group descriptor providing information regarding a first group of target ports of the first storage processor and denotes the first storage processor and first group of target ports as available, and the response may also include second information comprising a second target port group descriptor providing information regarding a second group of target ports of the second storage processor and denotes the second storage processor and second group of target ports as available. The virtualized path may be generated as a result of performing port failover processing responsive to a planned unavailability or an unplanned unavailability of any of the second physical target port and a storage processor associated with the second physical target port.

In accordance with another aspect of the invention is a computer readable medium comprising code stored thereon for processing requests, the computer readable medium comprising code for: receiving a request at a data storage system, wherein the request is a command to perform first processing and the request is sent from a client over a virtualized path, the virtualized path including a virtual target port of the data storage system, the virtual target port being a first physical target port that provides a virtualized counterpart port for a second physical target port whereby requests directed to the second physical target port are routed to the first physical target port rather than the second physical target port; performing said first processing and generating a response to the request, wherein the response includes first information consistent with sending the request over a non-virtualized path to the second physical target port; and sending the response to the client. The computer readable medium may further comprise code for determining a first data value that would be included in a generated response to the request if the request had alternatively been received by the second physical target port over a non-virtualized path. The response may include the first data value, and wherein a generated response to the request may include a second data value different from the first data value when the request is received over a non-virtualized path including the first physical target port. A second request to perform the command may be sent from the client over a non-virtualized path including the first physical target port, and the computer readable medium may further include code for sending, in response to the second request, a second response to the client, the second request including the second data value. The second physical target port may be inoperative and the first physical target port may receive requests from the client directed to the first physical target port while also receiving requests directed to the second physical target port as a result of the first physical target port virtualizing the second physical target port.

In accordance with another aspect of the invention is a data storage system comprising: a first storage processor associated with a first set of target ports; a second storage processor associated with a second set of target ports; a computer readable medium comprising code stored thereon for: receiving a request at the data storage system, wherein the request is a command to perform first processing and the request is sent from a client over a virtualized path, the virtualized path including a virtual target port of the data storage system, the virtual target port being a first physical target port of the first set that provides a virtualized counterpart port for a second physical target port of the second set whereby requests directed to the second physical target port are routed to the first physical target port rather than the second physical target port; performing said first processing and generating a response to the request, wherein the response includes first information consistent with sending the request over a non-virtualized path to the second physical target port; and sending the response to the client.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is a name table managed by name server database in the switch;

DETAILED DESCRIPTION

Figure 1:
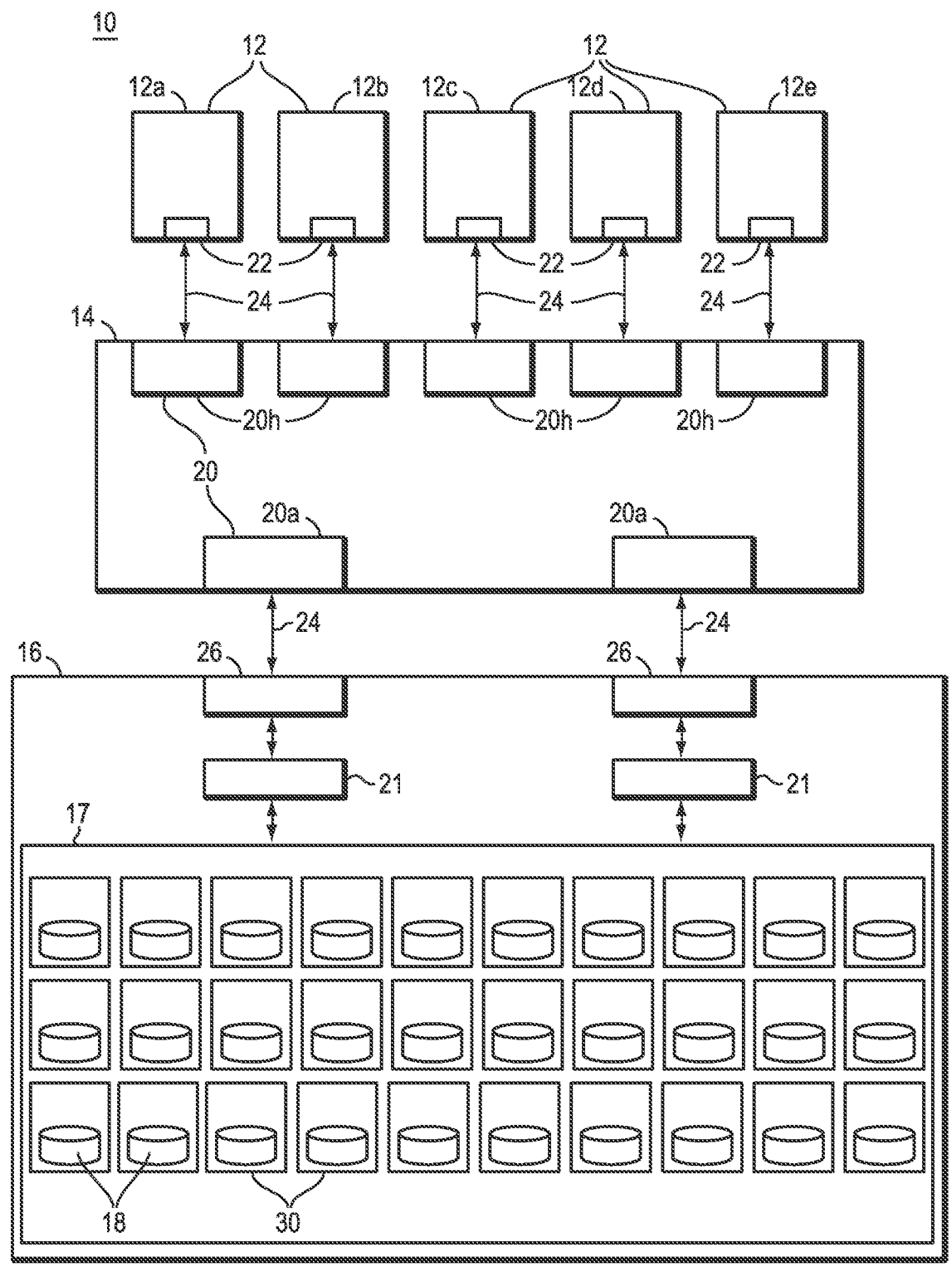
FIG. 1 is a storage area network comprising a data storage system and hosts coupled to a Fibre Channel fabric switch.

The techniques herein may be implemented in numerous ways, including as a process, an apparatus, a system, a computer program embodied on a computer readable storage medium, and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the techniques herein is provided below along with accompanying figures. The techniques herein may be described in connection with such embodiments, but are not limited to any embodiment provided for exemplary and illustrative purposes. The scope of the invention is limited only by the claims and the invention encompasses numerous alternatives, modifications and equivalents. Numerous specific details are set forth in the following description in order to provide a thorough understanding of the techniques herein. These details are provided for the purpose of example and techniques herein may be practiced according to the claims without some or all of these specific details. For the purpose of clarity, technical material that is known in the technical fields related to the invention has not been described in detail so that the techniques herein are not unnecessarily obscured.

Described below is a technique for use in managing a port failover in a data storage system. The technique as described herein can leverage the technology Fibre Channel N-Port ID Virtualization ("NPIV") in a Fibre Channel switch for providing port failover capability. The storage system can dynamically move a failed port's identity to another functioning port using NPIV. This can cause the Fibre Channel switch to redirect the traffic previously destined to a port to another port. The hosts see this transition as a simple "bounce" of the Fibre Channel connection and are completely unaware of the redirection occurring. Conversely, similar mechanisms may be used to undo the redirection ("port failback").

Conventionally, storage systems may configure multiple paths between the hosts and the storage system. This may include multiple physical connections to two or more storage processors within the system. This may ensure continued connectivity to the storage system even if there is a failure of a single physical connection or storage processor. Furthermore, the hosts may comprise failover software to detect the failed paths and redirect I/O to the remaining good paths. An advantage of the technique described herein is that the port failover is storage system based and thus host failover software is not required to manage storage array port failover.

Referring to FIG. 1, there is illustrated an example of a storage area network 10 in which the technique described herein can be implemented. The storage area network 10 employs a Fibre Channel fabric topology. It will be known by those skilled in the art that Fibre Channel is a high speed serial transport used in storage systems. The hosts 12 illustrated as 12a, 12b, 12c, 12d and 12e communicate with a Fibre Channel "fabric". In this embodiment, the Fibre Channel "fabric" is a switch 14. A data storage system 16 including a data storage area 17 communicates with the switch 14. It will be appreciated by those skilled in the art that the terms storage system or storage array or array may be used interchangeably throughout this disclosure with the same meaning. In this embodiment, the data storage area 17 within the storage system 16 comprises disk drives 18 and the hosts 12 may communicate with the disk drives 18 via a cross-point Fibre Channel connection through the switch 14.

The switch 14 includes switch ports 20. Host facing switch ports are labeled as 20h. Storage system or array facing switch ports are labeled as 20a. Host ports 22 on the hosts communicate via Fibre Channel links 24 to host-facing switch ports 20h on the switch 14. Physical ports 26 on the storage system or array 16 are associated with storage processors (SPs) 21 and communicate via Fibre Channel links 24 to array-facing switch ports 20a on the switch 14. The disks 18 within the storage system 16 are organized into logical units ("LUNs") 30. "LUN" is used to describe a logical unit of physical storage space. The LUNs are exported by the ports 26 for access by the hosts 12 via the Fibre Channel links 24 and switch 14. As herein shown, each disk appears to be configured as a separate LUN, though it is understood that a LUN can encompass part of a disk, or parts of multiple disks, or multiple complete disks. The arrangement shown is chosen for convenience of description.

Each Fibre Channel device including but not limited to host ports and array ports has two identifying characteristics—a name and an address. Fibre Channel names, known as "world wide names", are unique—every Fibre Channel device has its own unique name. Each Fibre Channel device also has an address referred to in Fibre Channel parlance as an "ID". The IDs are used for directing information between hosts and storage systems. Port addresses are commonly referred to as "port IDs". LUN addresses are commonly referred to as "LUN numbers". After initialization, the hosts 12 communicate with the ports 26 and LUNs 30 by sending messages to the appropriate port ID and LUN number.

Figure 2:
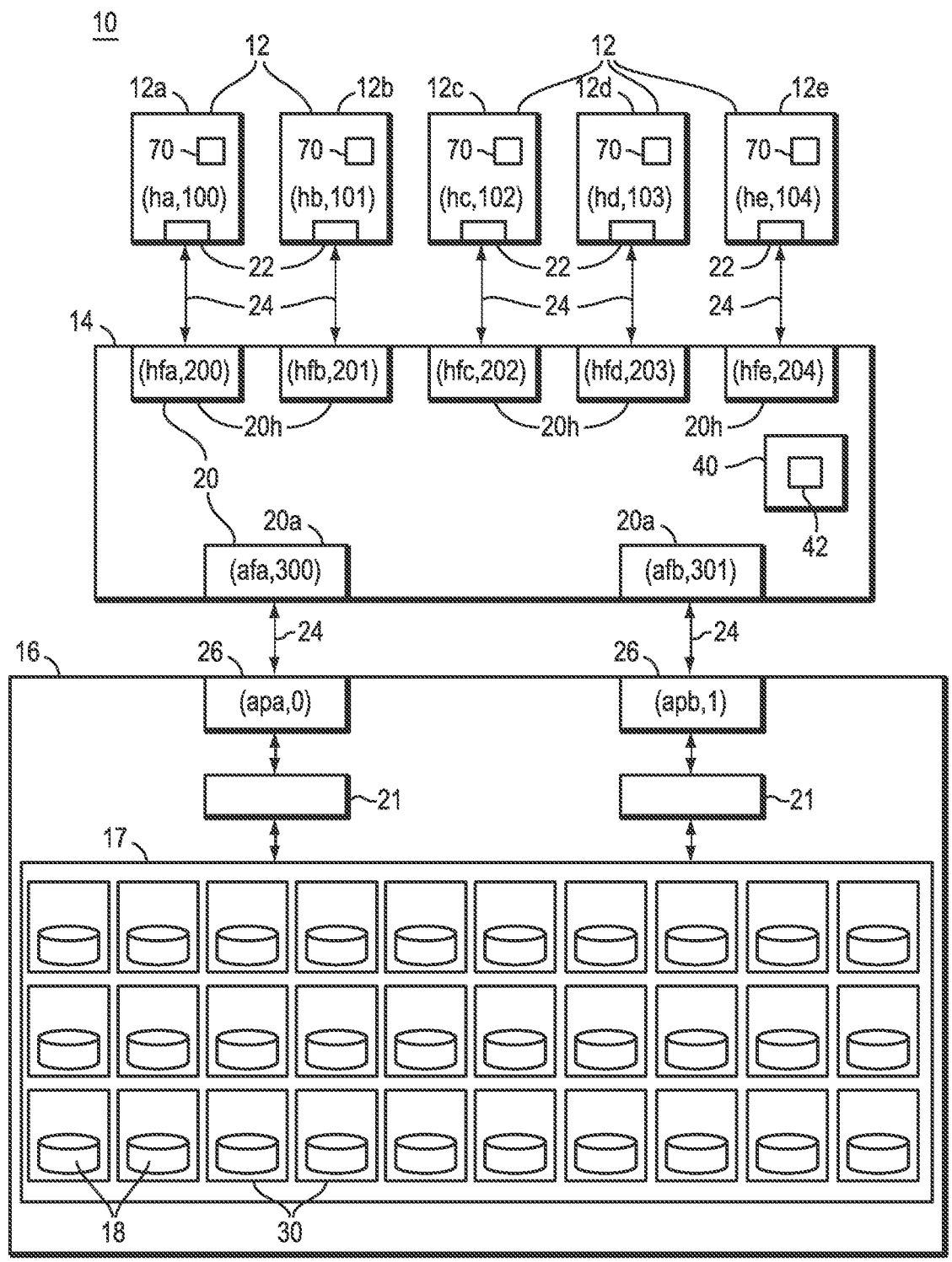
FIG. 2 is the storage area network of FIG. 1 showing port names and IDs.

Referring to FIG. 2, there is illustrated the storage area network of FIG. 1 showing port names and IDs. In a Fabric topology, the switch 14 assigns IDs to the ports 22 and ports 26 during initialization. IDs as described in the Fibre Channel specification are actually 24 bit quantities containing several fields. However, in this figure the names and IDs are shown symbolically with alphanumeric symbols for simplicity of explanation. The names and IDs of each port and LUN are shown as a pair (name, ID). For instance, the port 22 on the host 12a is shown to have a name and ID of (ha, 100). The names and IDs for the ports 22 on the hosts 12b-e are (hb, 101), (hc, 102), (hd, 103) and (he, 104). The switch ports 20h are shown to have names and IDs (hfa, 200), (hfb, 201), (hfc, 202), (hfd, 203), and (hfe, 204). The switch ports 20a are shown to have names and IDs (afa, 300) and (afb, 301). The ports 26 are shown to have names and IDs (apa, 0), and (apb, 1). It will be appreciated that the LUNs 30 will also have a name and LUN number. However, for ease of illustration, this is not shown in the figure.

Figure 3A:
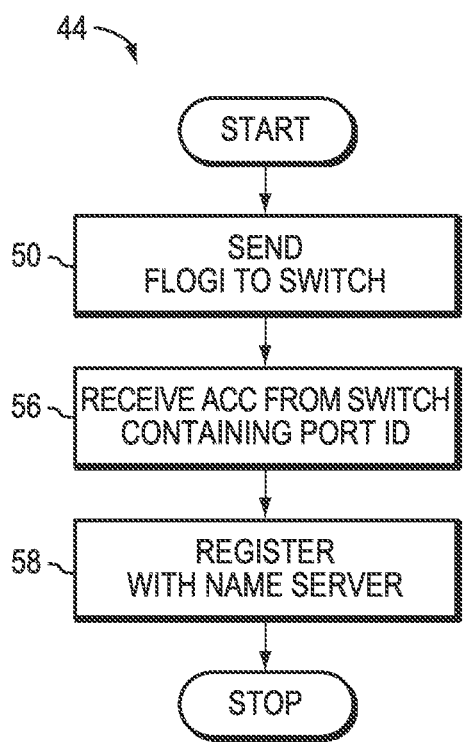
FIG. 3A is a flow diagram representing the operation of the data storage system during initialization.
Figure 3B:
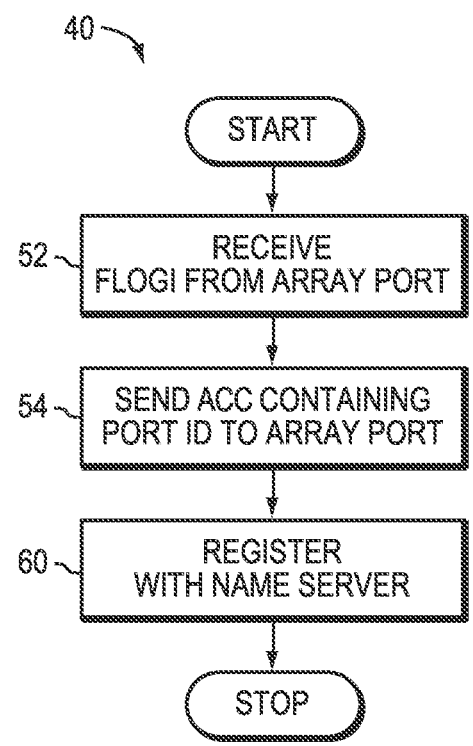
FIG. 3B is a flow diagram representing the operation of the switch during initialization.

Referring to FIGS. 3A and 3B, there is illustrated two flow diagrams representing the operation of the data storage system and the switch, respectively, during initialization. It will be appreciated that in this embodiment the Fibre Channel switch 14 includes a name server database 40. The name server database 40 is used by the switch 14 to assign IDs to ports 22 and ports 26 during initialization. The name server database 40 includes a name server table 42 that is used by the switch to resolve IDs to names. First, for each storage system or array port (i.e. ports 0 and 1), the data storage system sends a port login "FLOGI" command to the switch 14 containing the port name (FIG. 3A step 50). The port logins are received by the switch 14 (FIG. 3B step 52). When the switch 14 receives a port login command, it responds by sending an acknowledgement message to the data storage system (FIG. 3B step 54). This acknowledgement message contains a port ID for the port that was logged in. The acknowledgement message is received by the data storage system (FIG. 3A step 56). Then, a registration process is performed by the switch 14 (FIG. 3A step 58, FIG. 3B step 60). During the registration process, the name server table 42 containing port names and corresponding port IDs is built and distributed to nodes registered to receive it.

Referring to FIG. 4, there is illustrated an example of name table 42 managed by name server database in the switch. It will be appreciated that the figure shows only the portions of the table 42 sufficient to contribute to an understanding of the table. The table 42 includes entries 62 having a port name field 64 and a port address ID field 66. In this embodiment, the table 42 also includes a third field 68 identifying the switch port name that received the port login "FLOGI" command during initialization. It is believed that the field 68 may assist in giving a better understanding of techniques described herein. It can be seen from the figure that an entry 62 in the table 42 includes the port name apa and port ID 0 and the switch port name afa that received the port login during initialization. Additionally, there is a further entry 62 in the table 42 including the port name apb and port ID 1 and the switch port name afb that received the port login during initialization. The switch 14 then sends the table 42, or at least the entries relating to the port name and ID, to all members of the SAN 10 registered to receive state change notifications. This includes the hosts 12. The hosts 12 now have the port IDs of the ports 26 so Fibre Channel communications between the hosts 12 and array 16 can ensue.

It will be appreciated by those skilled in the art that now that the hosts have IDs to access the ports, they can also learn what LUNs are available. LUN names and numbers are managed at the storage system level. Each host 12 sends a query to each port 26 ID in turn requesting a list of available LUN numbers. Once the LUN numbers for a given port ID are known, the host 12 is able to query each LUN 30 by using a combination of the port ID and LUN number to access the LUNs 30. The host 12 then queries each LUN 30 for its corresponding LUN name. Once the host has gathered all this information, it builds a directory LUN table (not shown) that relates LUN names, port IDs, and LUN numbers. During operation, hosts 12 refer to LUNs 30 by their LUN numbers. In order to access a LUN 30, a host port 22 sends a message whose Fibre Channel address includes the port ID and LUN number. The switch 14 parses the port ID portion of the address in order to forward the message to the identified port 26. The storage system 16 then uses the LUN number portion of the address to access the proper LUN 30 within the system 16.

Figure 5:
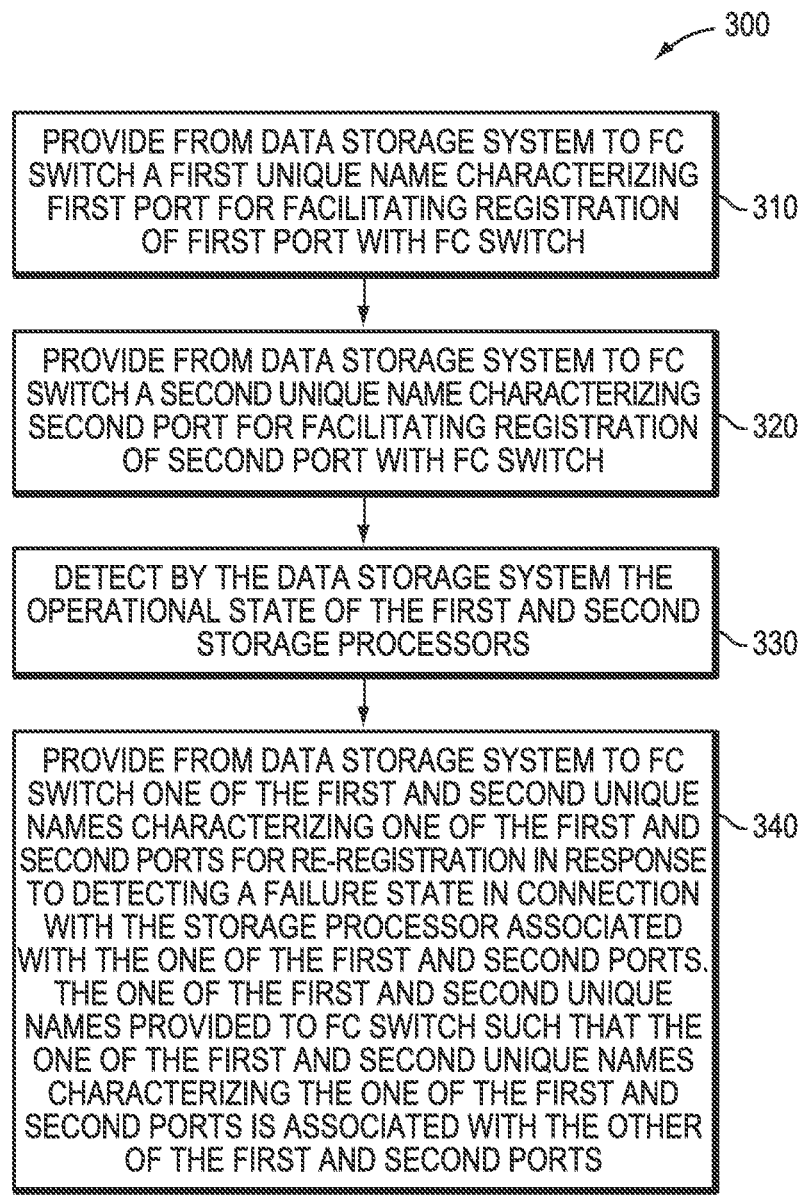
FIG. 5 is a flowchart summarizing the steps of a technique for use in managing port failover in the data storage system.

Referring to FIG. 5, there is illustrated a technique 300 for use in managing a port failover in a data storage system. The storage system 16, similar to that as described and illustrated with respect to FIGS. 1 and 2, comprises a first storage processor 21 and an associated first port 26 and a second storage processor 21 and an associated second port 26. Additionally, the storage system comprises a communications channel (not shown) between the two storage processors 21 for facilitating communication between the respective processors. In this embodiment, the data storage system is also adapted to communicate with a Fibre Channel switch 14 such that read and write I/Os can be directed to the first and second ports 26. Moreover, in the embodiment, the Fibre Channel switch 14 comprises NPIV technology such that a single physical port in the data storage system 16 may have multiple virtual ports associated therewith.

The technique as described herein comprises providing 310 from the data storage system 16 to the Fibre Channel switch 14 a first unique name characterizing the first port 26 for facilitating registration of the first port 26 with the Fibre Channel switch 14. The first unique name provided from the data storage system 16 to the Fibre Channel switch 14 such that the first unique name is associated with the first port 26. For example, the data storage system 16 may send a port login "FLOGI" command to the switch 14 containing the port name. It will be appreciated that the first storage processor 21 associated with the first port 26 may provide or send the port login "FLOGI" command to the switch containing the world wide name ('apa') of the first port 26. The port login may be received by the switch 14 and the switch may respond in turn by sending to the data storage system a first port address or ID ('0') for the first port such that the first unique name and the first port address are associated with the first port. It will be appreciated that a registration process may be performed by the switch 14 such that a name server table 42 can be built.

The technique further comprises providing 320 from the data storage system 16 to the Fibre Channel switch 14 a second unique name characterizing the second port for facilitating registration of the second port with the Fibre Channel switch. The second unique name provided from the data storage system 16 to the Fibre Channel switch 14 such that the second unique name is associated with the second port. The step may be performed in a similar manner to the previous step 310 with the exception that the second storage processor 21 may provide or send a port login "FLOGI" command to the switch containing the world wide name ('apb') of the second port. The switch may respond in turn by sending a second port address or ID ('1') for the second port and registering the second port such that the second unique name and the second port address are associated with the second port. The registration process may be performed by the switch 14 such that a name server table 42, as described above, containing port names and their corresponding port IDs may be built and distributed to nodes registered to receive it. It will be appreciated that the table may be substantially similar to the table 42 as described with respect to FIG. 4.

The technique comprises detecting 330 by the data storage system 16 the operational state of the first and second storage processors 21 in the data storage system. It will be appreciated that the operational states may include an active state and a failure state. It will also be appreciated that a failure state in connection with one of the first and second storage processors 21 activates deregistration of the port associated with the failed storage processor. For example, it will be understood from the foregoing that the storage processors are connected via a reliable communication channel. If one storage processor detects that the other storage processor is not responsive it may be concluded that the other storage processor has failed. It will also be appreciated that if either of the storage processors fails the world wide name of the port associated therewith provided for registration will be deregistered from the name server table 42. It will also be appreciated by those skilled in the art that the term 'a failure state' includes both planned failures and unplanned failures. For example, an upgrade of a storage processor may be considered a planned failure. An unplanned failure may be considered a more serious issue in which the storage processor unexpectedly fails.

Additionally, the technique comprises providing 340 from the data storage system 16 to the Fibre Channel switch 14 one of the first and second unique names characterizing one of the first and second ports 26 for facilitating re-registration of the one of the first and second ports with the Fibre Channel switch in response to detecting a failure state in connection with the storage processor associated with the one of the first and second ports. In accordance with the technique as described herein, the one of the first and second unique names is provided from the data storage system 16 to the Fibre Channel switch 14 for facilitating re-registration such that the one of the first and second unique names characterizing the one of the first and second ports 26 is associated with the other of the first and second ports. For example, if the first storage processor fails, the first port associated therewith may be deregistered or removed from the name server table 42 in the switch 14. In such a scenario, the second storage processor 21 associated with the second port 26 detects that the other first storage processor has failed and provides the world wide name associated with the first port ('apa') to the switch 14 for registration such that the world wide name of the first port ('apa') will be associated with the second port. In this embodiment, it will be appreciated that the storage processors may exchange relevant port-related data so that if a storage processor fails the surviving storage processor may have access to all the information about the port of the failed storage processor to take the necessary action in accordance with the technique. The switch as discussed above may comprise NPIV such that a single physical port, for example, the second port may have multiple virtual ports associated therewith. The technique as described herein may leverage the NPIV technology such that a virtual first address is issued in response to providing the world wide name of the first port to the switch for re-registration of the first port with the switch 14. The hosts are informed of the new virtual address and consequently I/O may be directed to the second port based on the second port address associated with the second world wide name and also the virtual first address associated with the first world wide name. This will be discussed in further detail below.

Figure 6A:
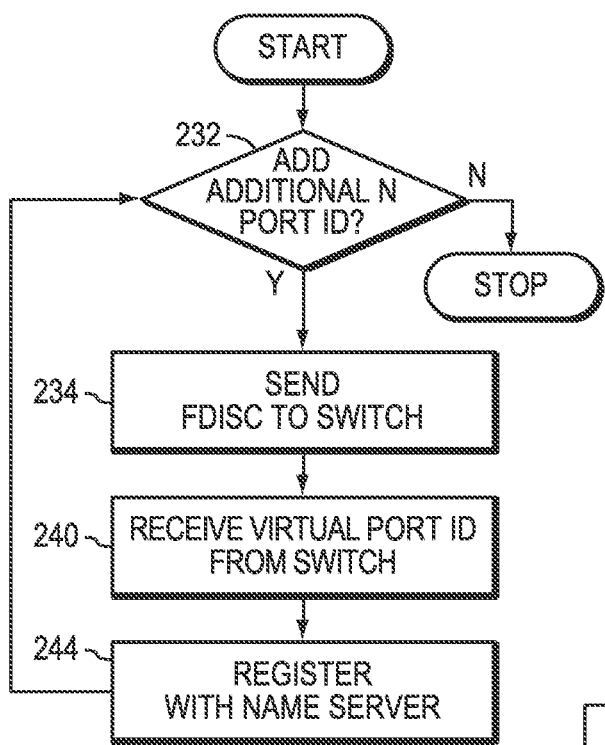
FIG. 6A is a flow diagram representing the operation of the data storage system when virtual port IDs are implemented on the data storage system.
Figure 6B:
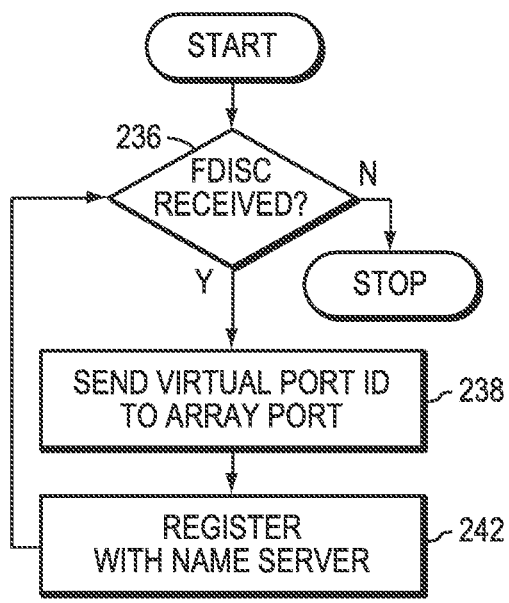
FIG. 6B is a flow diagram representing the operation of the switch when virtual port IDs are implemented on the data storage system.

Referring to FIGS. 6A and 6B, there is illustrated two flowcharts representing the operation of the data storage system and switch, respectively, when virtual port addresses or IDs are implemented on the data storage system. It will be appreciated in the example provided herein that the ports in the data storage system were registered during initialization as described with respect to FIG. 3. Furthermore, it will be appreciated that if a virtual port ID is required by an array port 26 (step 232) a "FDISC" command containing port name (step 234) is sent to the switch. For example, it will be understood that an array port may require a virtual port ID by virtue of a failure in connection with a storage processor and the consequential deregistration of the port associated therewith. The switch 14 receives the FDISC command (step 236) and responds by sending a virtual port ID to the storage system (step 238). It will be understood that if the FDISC command is received on a link where the port is not FLOGI-ed in, the FDISC command will be rejected. In other words, a physical port must be logged-in in order to be able to request and receive virtual port IDs. The storage system receives the virtual port ID from the switch 14a (step 240). The switch 14a and storage system then perform the registration process to add the port name and virtual port ID to the name server table 42 (steps 242, 244). The FDISC command and response is repeated if further virtual ID's are required for each physical port (steps 232-244).

Figure 7:
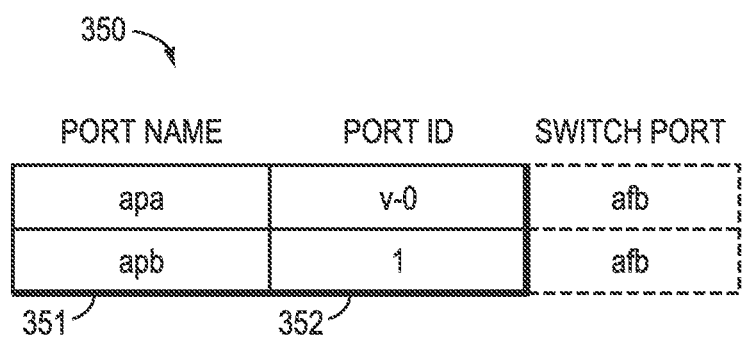
FIG. 7 is a name table in the switch built implementing the technique as described herein.

Referring to FIG. 7, there is illustrated an example of a name server table built in accordance with the technique as described herein. In this example, the first storage processor associated with the first port has failed. Because of the failure, the world wide name associated with the first port is no longer active in the switch's database. It has been deregistered. This causes the data storage system to send an "FDISC" command containing the port name ('apa') to the switch for re-registration such that the world wide name ('apa') of the first port may be associated with the second port. It will be appreciated that the second storage processor associated with the second port may provide the first unique name ('apa') associated with the first port to the switch for re-registration. The switch comprising NPIV sends a virtual first port address or ID to the second port and re-registers and associates the first world wide name with the second port. In this example, the switch will direct I/O to the second port, which registered both the first and second world wide names, based on the first virtual address or ID and the second address or ID. The table 350 as illustrated includes a port name field 351 and a port address ID field 352. The port name field includes the name of the first port 'apa' and the second port 'apb'. The port address ID field comprises the virtual address 'V-0' of port name 'apa' and the address '1' of port name 'apb'. It will also be appreciated that a third field is illustrated identifying the port that received the "FDISC" command (steps 234 and 236). This is included to clearly illustrate that the I/O will be directed to the storage system by the switch through switch port afb and the second port of the storage system. The switch sends the table, or at least entries relating to port name and ID, to all members of the SAN registered to receive state change notification. Accordingly, the hosts have the port addresses or IDs of the ports so Fibre Channel communications between the hosts and storage system or array can ensue.

It will be appreciated by those skilled in the art that now that the hosts have IDs to access the ports, the hosts can determine what LUNs are available as discussed above. For example, each host 12 may send a query to each port 26 ID requesting a list of available LUN numbers. Once the LUN numbers for a given port ID are known, the host 12 may query each LUN 30 by using a combination of the port ID and LUN number to access the LUNs 30. The host 12 may then query each LUN 30 for its corresponding LUN name. Once the host has gathered all this information, it may build a LUN table that relates LUN names, port IDs, and LUN numbers.

Figure 8:
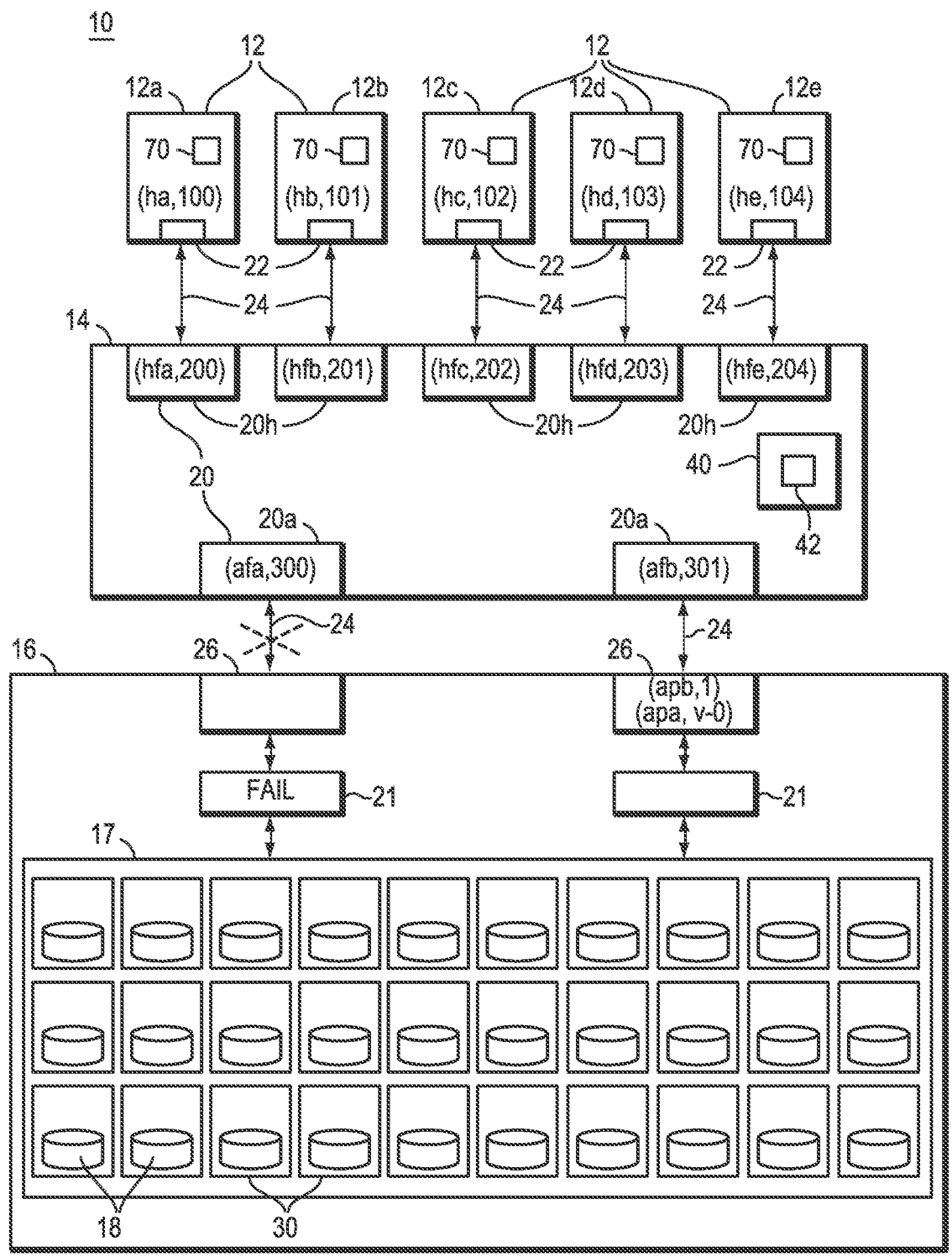
FIG. 8 is the storage area network showing port names and IDs implementing the technique as described herein.

Referring to FIG. 8, there is illustrated a representation of a storage area network implementing the technique as described herein. In this example, the first storage processor associated with the first port has failed, and the Fibre Channel link 24 between first port 26 and array-facing switch port afa, as illustrated in the figure, cannot facilitate communication between switch and storage system. Accordingly, in accordance with the technique, the second storage processor associated with the second port provides the first unique name ('apa') associated with the first port to the switch for re-registration. The switch comprising NPIV sends a virtual first port address or ID to the second port and re-registers and associates the first world wide name with the second port. It can be seen from the figure that the world wide names 'apb' and 'apa' are both associated with the second port in accordance with the technique.

Figure 9:
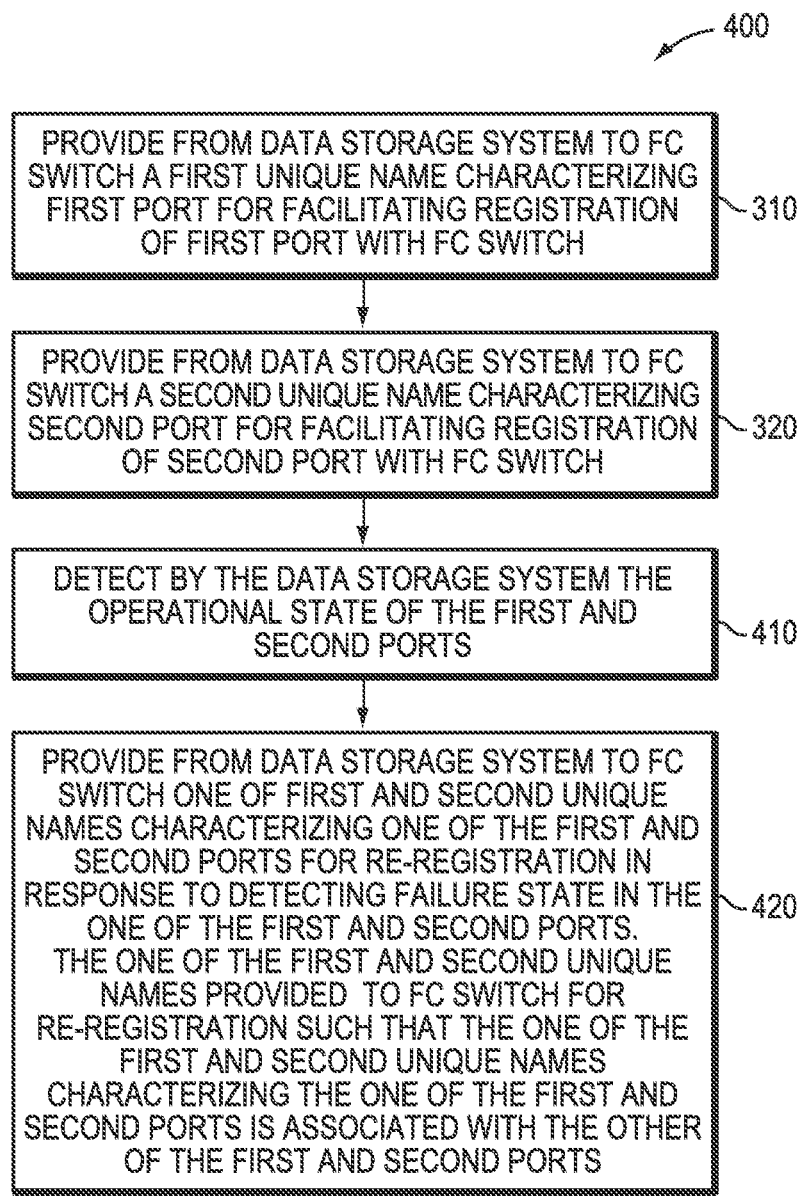
FIG. 9 is a flowchart summarizing the steps of a further technique for use in managing port failover in the data storage system.

Referring to FIG. 9, there is illustrated a further technique 400 for use in managing a port failover in a data storage system. The technique is substantially similar to the technique 300 as described with respect to FIG. 5. The steps 310 and 320 are the same as FIG. 5 and similar comments apply to similar steps. However, the technique with respect to FIG. 9 comprises detecting 410 the operational state of the first and second ports. A failure state in connection with one of the first and second ports activating deregistration of the unique name of the port. The technique herein differs from the previous technique in that it monitors and detects the state of the ports. For example, if the cable to the port is pulled then the technique may detect a failure state in connection with the port. The technique also comprises providing 420 from the data storage system to the Fibre Channel switch one of the first and second unique names characterizing one of the first and second ports for facilitating re-registration of the one of the first and second ports with the Fibre Channel switch in response to detecting a failure state in connection with the one of the first and second ports. The one of the first and second unique names provided from the data storage system to the Fibre Channel switch for facilitating re-registration such that the one of the first and second unique names characterizing the one of the first and second ports is associated with the other of the first and second ports. For example, if the first port fails, the first port may be deregistered by removing the name from the name server table in the switch. In such a scenario, the second storage processor associated with the second port may provide the world wide name associated with the first port to the switch for registration such that the world wide name of the first port may be associated with the second port. As discussed above, the switch may comprise NPIV such that a single physical port, for example, the second port, may have multiple virtual ports associated therewith. The technique as described herein may leverage the NPIV technology such that a virtual first address is issued in response to providing the world wide name of the first port to the switch.

Figure 10:
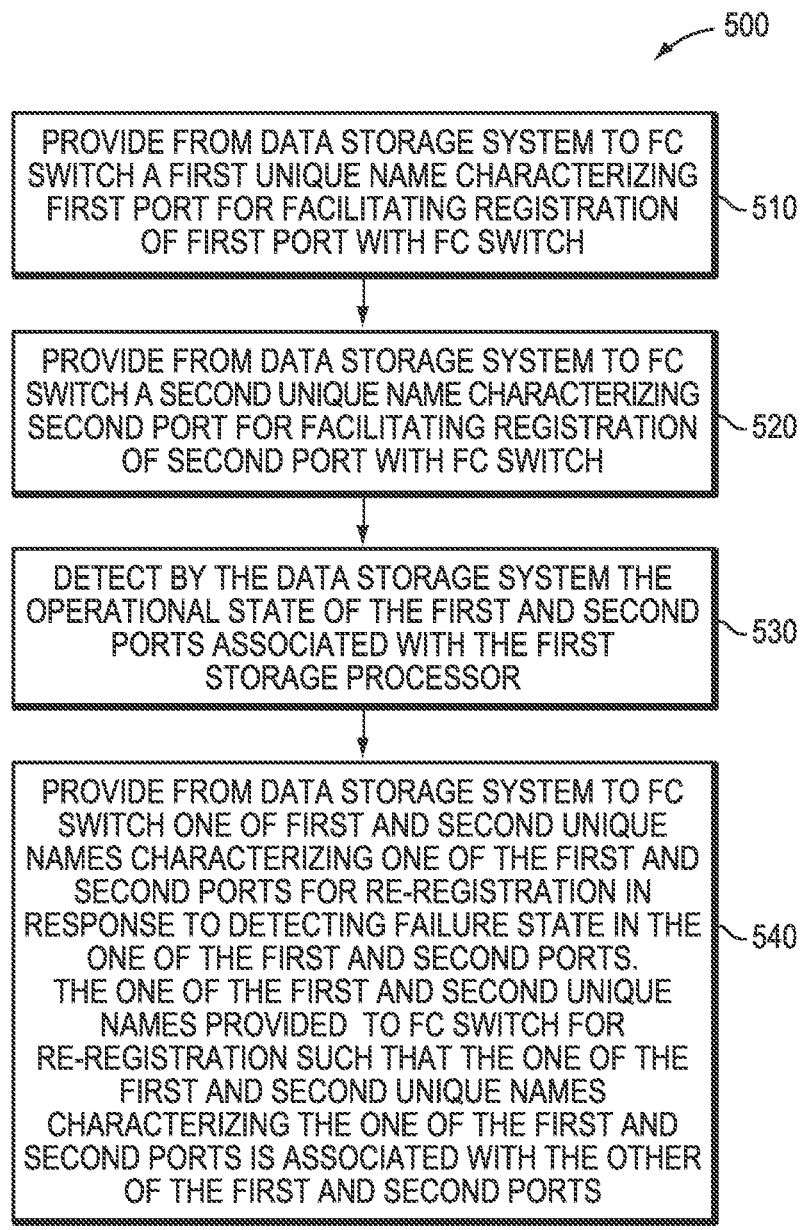
FIG. 10 is a flowchart summarizing the steps of a still further technique for use in managing port failover in the data storage system.

Referring to FIG. 10, there is illustrated a further technique 500 for use in managing a port failover in a data storage system comprising a storage processor having more than one port associated therewith. The technique as described in this figure differs from the previous techniques in that in the embodiment the data storage system comprises a first storage processor and first and second ports associated with the first storage processor. In this embodiment, the data storage system provides 510 to the Fibre Channel switch a first unique name characterizing a first port associated with the first storage processor for facilitating registration of the first associated port with the Fibre Channel switch. The first unique name is provided from the data storage system to the Fibre Channel switch such that the first unique name is associated with the first associated port. Furthermore, the data storage system provides 520 to the Fibre Channel switch a second unique name characterizing the second port associated with the first storage processor for facilitating registration of the second associated port with the Fibre Channel switch. The second unique name is provided from the data storage system to the Fibre Channel switch such that the second unique name is associated with the second associated port. Additionally, the data storage system detects 530 the operational state of the first and second ports associated with the first storage processor in the data storage system. A failure state in connection with one of the first and second associated ports activates deregistration of the port. Moreover, the data storage system provides 540 to the Fibre Channel switch one of the first and second unique names characterizing one of the first and second associated ports for facilitating re-registration of the one of the first and second associated ports with the Fibre Channel switch in response to detecting a failure state in connection with the one of the first and second associated ports. The one of the first and second unique names is provided from the data storage system to the Fibre Channel switch for facilitating re-registration such that the one of the first and second unique names characterizing the one of the first and second associated ports is associated with the other of the first and second associated ports. For example, if the first port fails, the first port may be deregistered by removing the name from the name server table in the switch. In such a scenario, the first storage processor associated with both the first and second ports may provide the world wide name associated with the first port to the switch for registration such that the world wide name of the first port may be associated with the second port. As discussed above, the switch may comprise NPIV such that a single physical port, for example, the second port, may have multiple virtual ports associated therewith. The technique as described herein may leverage the NPIV technology such that a virtual first address is issued in response to providing the world wide name of the first port to the switch for re-registration.

While the above techniques describe port failover in a data storage system, it will be appreciated that the techniques may in some embodiments be configured for managing port failover between different data storage systems.

It will also be understood that in certain embodiments a subset of LUNs may be visible only to one port. It will be appreciated that in these embodiments if a port were to fail the LUNs may also be visible to the virtualized port upon successful failover.

In connection with SCSI-based storage, a path may be formed between an initiator port, such as may be included in an HBA (host bus adapter) of a host, and a target port of a data storage system, such as a target port of an SP of a data storage system. One or more LUNs may be visible and accessible to the host over one or more paths. A LUN may be visible to a host over a path if the path has been recognized by the host. However, at a point in time, the LUN may not be accessible (e.g., the host cannot issue I/Os to access data of the LUN) over a particular path although the path may be characterized as visible. Thus, the LUN may be visible over multiple paths even though data of the LUN may not be accessible over all such visible paths. In this manner, the host may discover multiple paths to the LUN before the data of the LUN is accessible over all the multiple paths. The foregoing states regarding LUN visibility and accessibility may be representing using different path states and port states.

In the embodiment described herein, associated with each SP may be a logical entity referred to as a target port group (TPG) including the one or more target ports of the SP. A TPG of an SP may be defined to include one or more target ports of the SP over which a set of one or more LUNs is visible and may also be accessible. In some embodiments, a LUN may be visible with respect to the entire TPG rather than on a port level basis. In other words, a LUN is visible on a TPG level. If the LUN is visible or accessible on a first target port in the TPG including that first target port, then the LUN is also accessible or visible on all targets ports of the TPG. Each TPG can take on a state (e.g., online/active or offline/passive). For a given LUN, the LUN is visible on a TPG level basis (e.g. with respect to all target ports of a TPG). As noted above, the LUN may be accessible through multiple TPGs—TPG A and TPG B—where TPG A may be offline and TPG B may be online thereby characterizing a passive-active model (e.g., passive referring to the offline status of TPG A and active referring to the online status of TPG B). In contrast there may be an active-active model where the LUN is accessible (e.g., online) through both of the foregoing TPGs. TPG A may be on a first SP A of a data storage system and TPG B may be on a second different SP B of the same or different data storage system. When the LUN is visible and currently accessible through a first TPG that is online on a first SP, the set of paths defined for the target ports of the TPG may be deemed the active set of paths. In a similar manner, the first TPG and first SP may be characterized as "active". When the LUN is visible through a second TPG of a second SP that is offline so that the LUN is not currently accessible on paths defined for the target ports of the second TPG, the set of paths may be deemed passive. In a similar manner, the second TPG and the second SP may also be characterized as "passive". By providing for both active and passive paths sets for a LUN, the host is able to discover all paths to both the first and second TPGs even though the LUN may not be accessible over all such paths at a point in time.

Consistent with description above and elsewhere herein, it should be noted that use of the term "online" to describe a state may also be characterized as "active". Furthermore, with reference to particular defined states of the ALUA (SCSI Asymmetrical Logical Unit Access) standard, a TPG, SP, path or target port for accessing data of a LUN, and the like, having a status of active or online may have an associated ALUA state of active-optimized. Similarly, consistent with description above and elsewhere herein, it should be noted that use of the term "offline" to describe a state may also be characterized as "passive". Furthermore, with reference to particular ALUA defined states, a TPG, SP, path or target port for accessing data of a LUN, and the like, having a status of passive or offline may have an associated ALUA state of standby or unavailable.

Described above are techniques that may be used in connection with port failover and port failback processing. Such techniques provide for virtual relocation or virtual movement of data storage system target ports. For example, in connection with a planned unavailability of a first SP A such as due to a planned SP upgrade, ports of the first SP A may be virtually relocated to ports of its peer SP B during the upgrade time. Thus, the same physical port of SP A may be associated with two WWNs of two physical target ports through virtual port assignment. NPIV and Fibre Channel (FC) are examples of standards that may be used in connection with techniques to move an identity of one port to another port, for example, when the port fails (or is otherwise inoperative or unavailable)

or when the SP including (or associated with) the port fails (or is otherwise inoperative or unavailable).

Furthermore, when the failed SP reboots and again becomes operative for processing host requests, the failed port(s) of the SP may resume their role as the primary or physical port as a result of failback processing. In this case, the physical port may once again log into the switch to redefine an association or assignment of the physical port ID and WWN as the primary association. The association or assignment of the virtual port ID and WWN may be considered as a secondary level association whereby if the primary association exists, the switch may use the primary association to override any secondary associations that may be defined for virtual port assignments. In this manner, when the previously failed physical port logs back into the switch, the primary association between physical port ID and WWN is once again established and may be used to override any existing secondary association for the virtual port assignment (e.g., whereby the same WWN is associated/registered with a virtual port ID).

Described herein are techniques that may be used in connection with coordinating SPs, information, and I/Os in connection with performing port failover processing and port failback processing. For example, there may be I/Os pending or "in flight" when an event occurs causing port failover processing or port failback processing to occur. For example, consider a case where failover processing has been performed due to a failed SP thereby causing I/Os to be directed to one or more virtual ports (e.g., registered as physical ports of the failed SP's peer). The failed SP now reboots and failback processing is performed so that I/O may be redirected from the virtualized ports back to the rebooting SP's physical ports. In accordance with techniques herein, I/Os directed to a virtual port may be quiesced prior to redirecting I/O back to the original physical port of the rebooting SP. Such techniques herein provide for coordinating takeover, for example, when SP B (previously failed) now comes back online after rebooting. As described in more detail below, coordination is needed in connection with bringing up and down different ports (e.g., switching from directing I/Os from physical to virtual port, and vice-versa). To the host, this switchover of ports may appear that a link between the data storage system and host experiences an intermittent bounce (e.g., intermittent period of unavailability). In connection with techniques herein, processing may be performed to ensure appropriate and suitable coordination of processing steps.

Described herein is a port matching technique to determine which ports take over failed ports. Each SP may maintain current port failover data for its ports and other SPs' ports to perform port matching for port failover. Additionally, each SP generates and maintains a current view of port information for all ports in the data storage system. The port failover data (such a denoting which port protects another port and also denoting which port is protected by another port) is generated when ports come online and such information is also updated when relevant trigger events occur on any of the failover-capable ports. When port failover properties change, port matching for failover is re-evaluated. An SP that discovers relevant changes to its port failover data causes a re-evaluation of port matching for failover of its ports. Similarly, when an SP receives peer port failover data, it re-evaluates port matching for failover of its ports. With ready access to current information about ports local to an SP and ports of other SPs, each SP independently evaluates port matching for failover. An inter-SP communication channel may be used by the SPs to proactively "push port information" to the other SP, in an unsolicited manner. Port failover data maintained may include port information such as related to whether ports are failover capable and/or failover enabled, what network fabric each port is connected to/belongs to, whether a port is available or not, and the like. For example, after a link "bounce" which generates a link event, a target port of the data storage system may be rediscovered and it may determined that it is now connected to a different fabric than prior to the link "bounce" occurrence. The particular fabric to which the target port is connected may affect which other ports can protect this port, and vice versa. Thus, port matching techniques may be re-performed responsive to such an event to re-evaluate what ports are protected by what other ports. Similarly, changing a port's property regarding whether a failover capabilities of a port have been enabled or disabled may cause SPs to update their local copy of port information and also re-execute the port matching techniques herein.

Also described herein are techniques for virtualization of an SP for port failover. When a port is virtualized (e.g., relocated as a virtual port to another physical port) such as when a physical port of a failed SP B is virtualized as a virtual port of SP A, processing may be performed to have SP A provide responses and behavior for requests received on the virtual port in a manner mimicking, or consistent with, the requests being received on the original physical port and serviced by SP B. Techniques are described which present a virtual identity for SP B and its virtual ports to appear to the host as if SP B and its ports still exist and are currently functional and running. For example, assume a configuration between a host and the data storage system using an active-passive model whereby SP B paths/ports are active and SP A paths/ports are passive. Failover processing may be performed (such as due to an upgrade to SP B) whereby SP B's ports are now relocated through port virtualization to SP A. In this case, SP A must respond to requests and commands as if SP B had processed the requests and commands so that host is unaware of any SP failure or outage with respect to SP B. In this manner, the host is presented with a view of behavior so that the host continues to do I/O and issue commands to SP B ports. Port failover processing and subsequent port failback processing may be performed by the data storage system rather than the host.

In connection with performing port failback processing (whereby I/Os are redirected from the virtual port back to the original physical port), it should be noted that some switches may properly support and handle an implicit takeover of a port address whereby the physical port logs back in while its secondary virtual port assignment exists. In switches supporting the implicit takeover, the physical and virtual port assignments may overlap in terms of definition within the switch and the switch may simply perform processing to use the primary physical port association rather than the virtual port. However, some switches may not support or properly handle implicit takeovers such as when the physical port comes back online. In this manner as described in more detail below, processing may be performed to ensure that the virtual port is unregistered before the physical port comes back online/relogs-in since operation of some switches may not support such implicit port takeovers whereby the primary port logs in while there is an existing secondary virtual port association for the same primary port. Techniques herein may be used to avoid having such overlap when both the physical and virtual port assignments exist for the same target port WWN.

In connection with techniques herein, an SP boots up and discovers its own ports and information (e.g., attributes or characteristics) about its own local ports. Such port information may include, for example, the number of ports, physical port characteristics such as speed or bandwidth capabilities (e.g. 4 gigabits/second, 2 gigabits/second), failover information including failover capabilities (e.g., whether the port can or cannot be used for failover/can assume another port's identity thereby virtualizing that port and handling I/O, commands and the like directed to the virtualized port), and what fabric or switch each port is attached to (e.g., fabric ID or switch ID). This port information and exemplary uses are described in more detail below. Each SP may also perform processing of the port matching technique described herein to establish/determine what ports of the SP will protect what other ports of the peer SP, and also what ports of the peer SP will protect ports of this SP. In this manner, each SP may determine port information about its own ports such as initially on booting.

Additionally, each SP updates its own local attributes/information regarding ports in response to trigger events. Such trigger events may include any link event of a relevant port for the SP thereby letting the SP update its state and port information dynamically based on changes over time. For example, SP A's port A0 may be attached to a first fabric, such as a first switch having switch ID1. At a later point in time, SP A's port 0 is reattached to a second different fabric such as second switch having switch ID2. SP A accordingly updates its local port information. The SP may share its local port information with any other interested SP such as the peer SP in the same data storage system or other SPs in a federation of multiple different data storage systems. Such information may be shared with other peer SPs in the same data storage system over an inter-SP communication channel.

In one embodiment as described herein, an SP may push a first portion of its port information to other interested SPs. However, each SP may independently determine a second portion of port information regarding its SP and about its peer SP (as well as generally about other SPs in the system) using port matching techniques. The particular information included in the foregoing first and second portions is described in more detail below. Each SP may store first portions of port information received/pushed by other SPs and may use such received information in connection with the SP independently performing port matchup processing thereby determining the SP's remaining second portion of port information.

In connection with the port failover technique, the data storage system may mask host initiator accessibility failures to ports, such as on an unavailable SP, by allowing other ports, such as on the peer SP, to assume the identity and behavior of the unavailable ports as virtualized ports in addition to its own physical connections. Such failover and also failback to the failed ports (once such ports again become operative) may be characterized as transparent to the host using such paths for I/O. From the host perspective, the failover and failback may appear like link events whereby ports log out and back into the switch.

Figure 11:
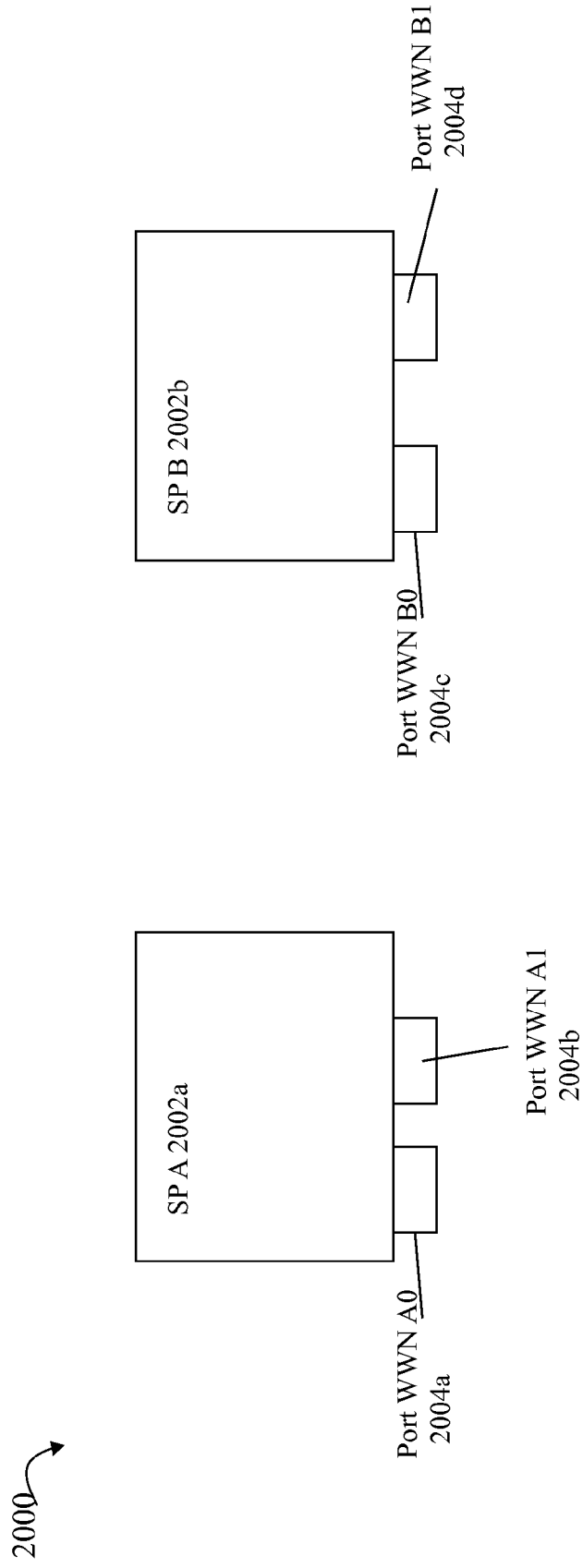
FIGS. 11-15 are examples used in connection with illustrating port matching techniques that may be performed in an embodiment in accordance with techniques herein.

Referring to FIG. 11, shown is an example of peer SPs of a data storage system as may be used in connection with performing port matching techniques described herein. The example 2000 includes two SPs 2002a, 2002b which may be peer SPs of a data storage system as described elsewhere herein. Note that other components that may be included in the data storage system are omitted for simplicity in illustration of the port matching techniques. SP A 2002a may include two ports 2004a, 2004b. SP B 2002b may include two ports 2004c, 2004d. Although the port matching technique is illustrated in connection with SPs each including the same number of two ports, it should be noted that the techniques herein may generally be used in connection with any number of ports per SP, or more generally between any two sets of ports (whereby each set of ports may not be bound to the same physical SP in a configuration). Additionally, the two sets of ports, such as on the two peer SPs, for which port matching is performed between "protected" and "protecting" ports (described in more detail below) may each include a different number of ports such as illustrated in connection with another example in following paragraphs.

In this example of port matching that will be described with reference to FIG. 11, the port matching entities and level of granularity is between SPs whereby ports from a first SP may failover to another SP when the first SP fails or any of its ports otherwise are unavailable. In other words, in some embodiments, it may be that either all ports of a single SP are running as physical ports or all such ports are running as virtual ports (e.g., such as hosted on another peer SP's set of physical ports). However it should be noted that other levels of granularity are possible for failover port matching. For example, with reference to FIG. 11, it may be that port 2004a of SP A is running virtualized as a virtual port of either port 2004c or 2004d of SP B while port 2004b of SP A is logged into the switch and running as a physical port for processing I/Os. In this manner, an embodiment using techniques herein may allow for different levels of granularity of running virtualized ports (e.g., allowing individual ports to run virtualized or not, allowing only defined groups of ports such as per-SP to run virtualized or not, and the like). Additionally, it should be noted that although examples may be presented herein where ports are virtualized on another SP but within the same data storage system, in some embodiments, a physical port of one data storage system (such as a data storage array) may run as a virtual port on a second different physical storage system (such as a different data storage array in the same federation). Such flexibility to provide for virtual ports effectively allows a first physical port to be moved or relocated as a virtual port to another second physical port for any reason such as, for example, when the first physical port or its SP has failed in an unplanned outage, when the first physical port or its SP is unavailable for planned outages such as with a hardware and/or software upgrade, when it may be desirable to move the first physical port to another data storage system to better utilize resources or otherwise provide other advantages. It will be appreciated by those skilled in the art that the foregoing and other particulars for this example should not be construed as limitations of techniques herein.

The port matching technique may be used to determine, at one or more points in time prior to any port or SP failure, which functioning port takes over for which particular failed port. As described in more detail, the port matching technique may determine, based on one or more matching criteria, which port of SP B will be protected by (e.g., virtualized by) which port of SP A such as upon failure of SP B. The port matching technique processing may be performed on each data storage system, and more particularly in this example, may execute on each SP. In this manner, each SP may independently determine which functioning ports takeover which failed ports via port virtualization. For example, SP A may perform the port matching technique described herein using a snapshot of SP B's port information and possibly other information in performing the port matchup. Similarly, SP B may independently perform the port matching technique described herein using a snapshot of SP A's port information and possibly other information in performing the port matchup. In this manner, processing for determining a set of port matches between SP A and SP B may be performed independently by both SP A and SP B so that if either SP A or SP B failsover (e.g., becomes unavailable for planned or unplanned reasons) to the other surviving SP, the surviving SP may use the port matching information to determine which of the surviving SP's ports take over for which of the failing SP's ports. The port matching technique described herein may also be performed responsive to other event occurrences such as, for example, after an SP reboots or comes back online as well as one or more other defined event occurrences as may be included in a defined policy. The matchup technique may be performed or repeated upon the occurrence of particular events such as, for example, each time there is a FC link event including switch logins and logouts (e.g., FLOGI and FDISC switch commands).

Figure 12:
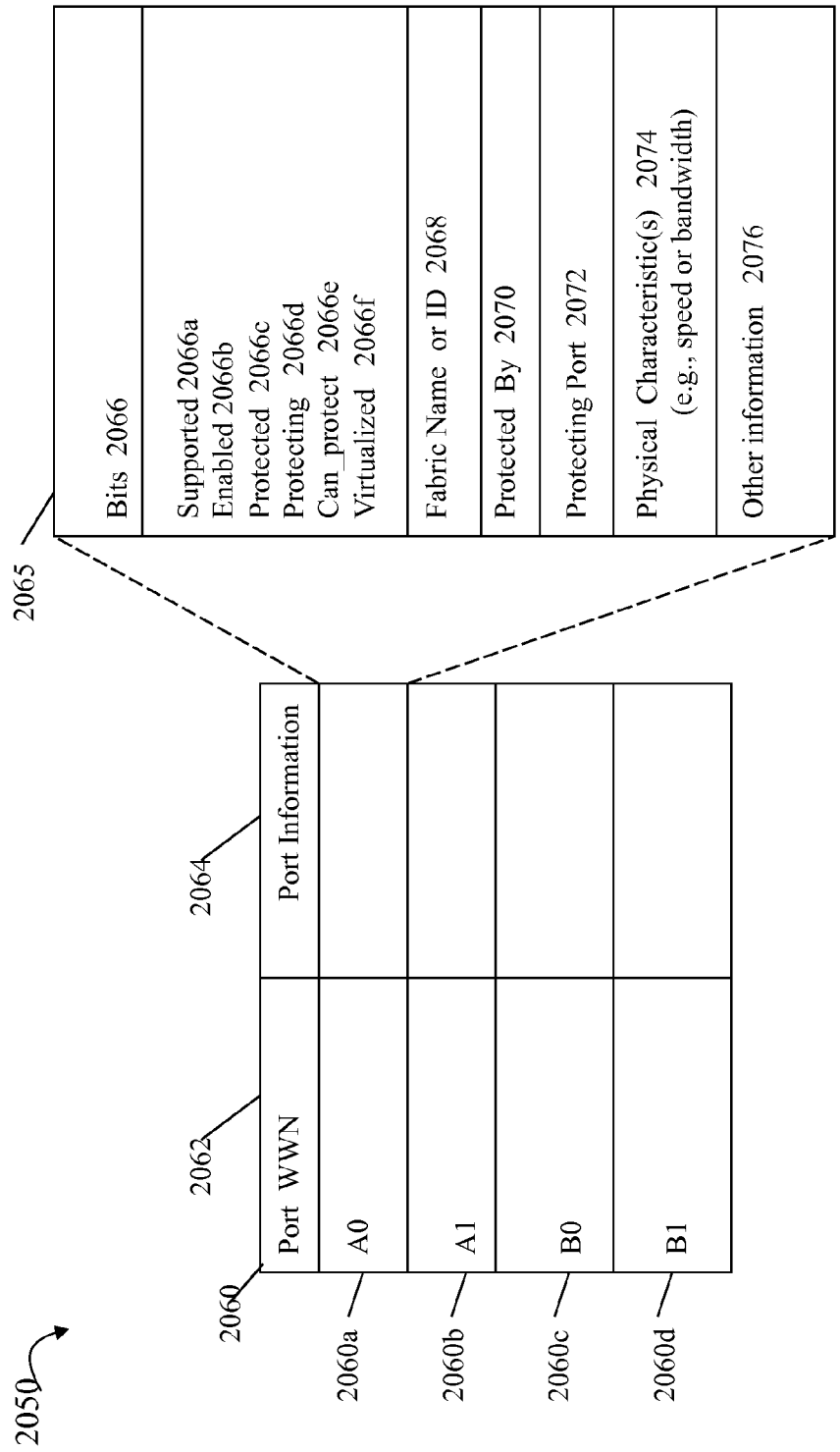

Referring to FIG. 12, shown is an example of port information as may be included on each SP for its ports as well as for ports of the peer SP in an embodiment in accordance with techniques herein. The example 2050 includes a table 2060 with an entry or row for each port identified in column 2062 having associated port information in column 2064. In this example continuing with FIG. 11, there are 4 ports having WWNs A0, A1, B0 and B1. Row 2060a of table 2060 includes port information for port WWN A0. Row 2060b of table 2060 includes port information for port WWN A1. Row 2060c of table 2060 includes port information for port WWN B0. Row 2060d of table 2060 includes port information for port WWN B1. For each of the foregoing ports, port information 2064 may be stored. At least some of the port information 2064 for each port may be included in criteria used in connection with performing port matching techniques.

Element 2065 illustrates in more detail exemplary information as may be maintained for each port's information in a row of the table 2060. Port information 2065 may be generally characterized as including port state and/or attribute or property information. Port information 2065 for each port may include one or more bits 2066 having settings denoting various state information for the port, a fabric name or identifier (ID) 2068, a field 2070 identifying a peer port which protects this port (if any) (e.g., upon failure of this port, this port fails over to the peer port identified in 2070 thereby running as a virtualized port on the peer port of 2070), a field 2072 identifying a peer port which this port is protecting (if any) (e.g., upon failure of the peer port, the peer port of 2072 fails over to this port thereby running as a virtualized port on this port), one or more physical characteristics 2074, and optionally other information 2076.

The bits 2066 may include one or more flag bits describing the operating status of the port including a supported bit 2066a, enabled bit 2066b, protected bit 2066c, protecting bit 2066d, can_protect bit 2066e and virtualized bit 2066f. Each of the foregoing bits of 2066 may have a setting of 1 or 0. The supported bit 2066a indicates whether this port is capable of supporting port failover as described herein (e.g., whether the physical port can be used as virtual port for a second physical port upon failure of the second physical port). A value of 1 for 2066a indicates that this port is capable of supporting port failover as described herein using virtualized ports, otherwise 2066a is zero. The enabled bit 2066b indicates whether the port failover feature as described herein (e.g., whether the physical port can be used as virtual port for a second physical port upon failure of the second physical port) is supported and also enabled. A value of 1 for 2066b indicates that this port is capable of supporting port failover as described herein using virtualized ports and additionally that this feature is also enabled/turned on for use, otherwise 2066b is zero. The protected bit 2066c indicates whether this port is protected by another port such as on a peer SP. A value of 1 for 2066c indicates that if this port should fail, another second port uses port failover to failover to a virtualized port for this port on a peer SP; otherwise 2066c is zero. The protecting bit 2066d indicates whether this port is protecting another second port such as on a peer SP. A value of 1 for 2066d indicates that if another second port should fail, this port is providing failover protection for this second port (e.g., upon failure of the second port, the second port fails over to this port which is used as a virtualized port for the failing second port); otherwise 2066d is zero. The canprotect bit 2066e indicates whether this port has the capability to protect another port but is not necessarily protecting another port. In other words, a value of 1 for 2066e indicates that this port has the capabilities needed to be considered a candidate as a "protector" port to which another port may failover; otherwise 2066e is zero. The virtualized bit 2066f indicates whether this port is currently running on/as a virtualized port rather than a physical port. A value of 1 for 2066f indicates that this port is currently running as a virtualized port and a value of 0 indicates that this port is currently running as a physical port (e.g., a value of 1 for 2066f indicates this port is currently being virtualized by another second physical port such as due to previous failure of this port and failover to the second physical port).

The fabric name or ID 2068 identifies the particular fabric, such as the switch, to which this target data storage system port is connected. Each switch or other component serving as the network or connection fabric to which the target port is directly connected may have a unique identifier thereby providing for differentiating between different physical switches and other components of the fabric. As described elsewhere herein, the fabric name or ID may be included in criteria used with port matching. For a first port to protect a second port upon failure of the second port (e.g., for one port to serve as a virtual port for the second should the second fail), both ports may be required to belong to the same fabric (e.g., same switch ID) as denoted by both ports having the same fabric name or ID 2068. The foregoing may be a requirement for some embodiments such as those using fibre channel connections.

Physical characteristics 2074 may include one or more physical attributes of the port such as related to performance capabilities of the port. For example, element 2074 may include the bandwidth or maximum data transfer rate for the port, current load/workload of the port, port-specific resources such as memory of the port, and the like. Element 2076 generally denotes that the port information 2065 may also include other information than as described herein.

It should be noted an SP may communicate information regarding its own ports (e.g., various portions of port information 2065) regarding its ports to the peer SP. For example, SP A may communicate to SP B a first portion of port information 2065 regarding A0 and A1 such as, for example, values of bits 2066a,b,e and f, and information of fields 2068 and 2074. As described in more detail below, other portions of the port information 2065 may be independently determined by each SP using port matching techniques described herein. In an embodiment, each SP may execute the same port matching technique processing steps so that each SP may determine the same such values.

The port matching technique described herein may include performing a first set of processing steps whereby the first SP performing the processing traverses a list of its own ports and determines which ports of the peer SP will be protected by the first SP's own ports. For example with reference back to FIG. 11, SP A performs such first processing to determine which port of peer SP B will be protected by port A0 (e.g., such that this protected port fails over to port A0 and is thereby virtualized by physical port A0), and which port of peer SP B will similarly be protected by port A1. Subsequently, a second set of processing steps may then be performed by the first SP whereby the first SP traverses a port list including ports of the peer SP and determines which ports of the peer SP will protect ports of the first SP. For example with reference back to FIG. 11, SP A performs such second processing to determine which port of peer SP B will protect port A0 (e.g., such that if port A0 fails, this port of the peer SP B virtualizes port A0), and which port of peer SP B will similarly protect port A1. The port matching technique uses one or more criteria to determine whether there is a match between two ports so that a first functioning port, such as of first SP, may protect a second port, such as a failing port of a peer SP. As such, the port matching techniques may be performed prior to the second port failure occurring so that when/if the second port fails, the first port knows that it has been assigned the role of protector port for the second port (e.g., and virtualizes the second port on the first physical port). In this manner, the second port may be virtually moved to the first physical port thereby handling I/Os from the host on behalf of the first port as well as the second port.

In connection with one embodiment, a first port may protect a second port if both ports meet one or more port matching criteria. For example, such criteria may identify one or more pieces of data or port information that must match between the first and second ports in order for the first port to be qualified or selected to protect the second port. For example, one embodiment may specify as port matching criteria that the two ports belong to the same network or connection fabric (e.g., both ports be connected to the same switch or other component). With reference back to FIG. 12, port matching processing may include determining whether both ports have the same fabric name or ID 2068 in order for either the first port to protect the second, or vice versa. Additional portions of port information 2065 may be used in specifying port matching criteria. For example, an embodiment may specify the following as port matching criteria: that the two ports belong to the same fabric (e.g., matching fabric name or IDs 2068), that the second port is not already protected by another port (e.g., the second port's protecting bit 2066d=0), that both the first and second ports be capable of failover protection and also enabled to provide port failover protection for another port (e.g., both have enabled bit 2066b=1), and that the first port providing the failover protection not already be protecting another port (e.g., first port's protecting bit 2066d=0 since in this example each port may only protect a single other peer port).

Figure 13:
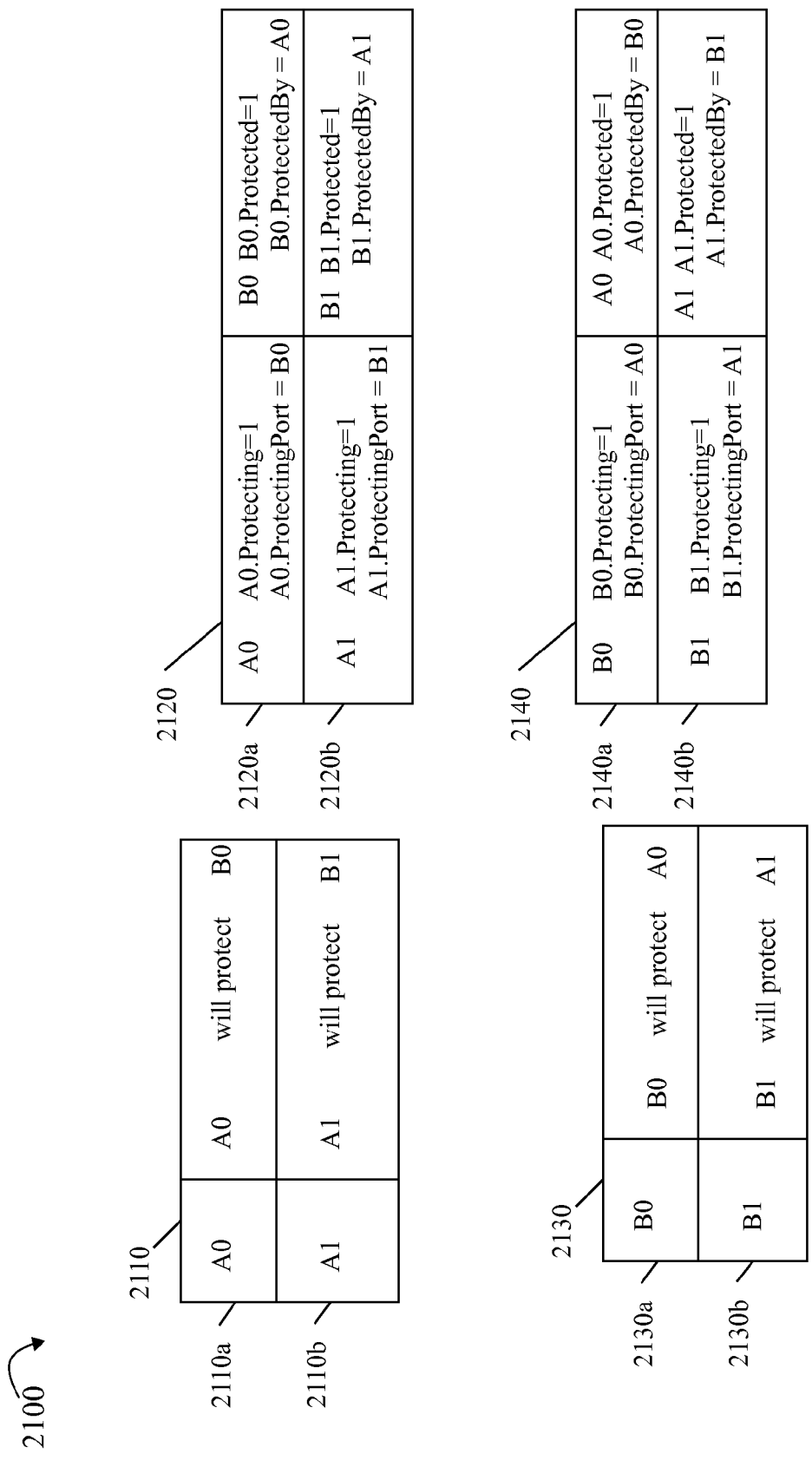

For example, with reference now to FIG. 13, shown is an example further illustrating port matching techniques herein such as a result of SP A performing processing as described above. The example 2100 includes a table 2110 denoting the results of SP A performing the first processing noted above whereby a determination is made regarding which ports of SP A will protect which ports of the peer SP B. Table 2110 includes entry 2110a denoting that port A0 of SP A will protect B0 of SP B since processing has determined a match between first port A0 and second port B0 in accordance with the above-mentioned matching criteria (e.g., A0 protects B0). Table 2110 includes entry 2110b denoting that port A1 of SP A will protect B1 since processing has determined a match between first port A1 and second port B1 in accordance with the above-mentioned matching criteria (e.g., A1 protects B1). Table 2120 denotes the particular port information (e.g., as described in connection with FIG. 12) that may be accordingly updated as a result of the matching ports A0 and B0 and matching ports A1 and B1. Entry 2120a indicates that A0's protecting bit 2066d is set to 1 and A0's protecting port field 2072 is set to port B0. Additionally, entry 2120a indicates that B0's protected bit 2066c is set to 1 and B0's protected by field 2070 is set to port A0. Entry 2120b indicates that A1's protecting bit 2066d is set to 1 and A1's protecting port field 2072 is set to port B1. Additionally, entry 2120b indicates that B1's protected bit 2066c is set to 1 and B1's protected by field 2070 is set to port A1.

The example 2100 also includes a table 2130 denoting the results of SP A performing the second processing noted above whereby a determination is made regarding which ports of SP B will protect which ports of SP A. Table 2130 includes entry 2130a denoting that port B0 of SP B will protect A0 since processing has determined a match between first port B0 and second port A0 in accordance with the above-mentioned matching criteria. Table 2130 includes entry 2130b denoting that port B1 of SP B will protect A1 since processing has determined a match between first port B1 and second port A1 in accordance with the above-mentioned matching criteria. Table 2140 denotes the particular port information (e.g., as described in connection with FIG. 12) that may be accordingly updated as a result of the matching port B0 as protecting A0, and matching port A1 as protecting B1. Entry 2140a indicates that B0's protecting bit 2066d is set to 1 and B0's protecting port field 2072 is set to port A0. Additionally, entry 2140a indicates that A0's protected bit 2066c is set to 1 and A0's protected by field 2070 is set to port B0. Entry 2140b indicates that B1's protecting bit 2066d is set to 1 and B1's protecting port field 2072 is set to port A1. Additionally, entry 2140b indicates that A1's protected bit 2066c is set to 1 and A1's protected by field 2070 is set to port B1.

Below is a pseudo-code representation of the port matching technique as described above in connection with FIG. 13. With reference to the representation below, SP A may be performing the processing and its ports may be included in the variable list myPortList, and SP B may be the peer SP having its ports included in the variable list PeerPortList.

```
// NPIV port selection pseudocode
// Assumption is that this SP has information for both (all) SPs
typedef struct_NPIV_PORT_INFO // port information bit from 2065 used as matching criteria
                              //in this example
{
    HTPF_Enabled,          // bit 2066b
    HTPF_ProtectedByPort,  // field 2070; Null = Not Protected
    HTPF_ProtectingPort,   // field 2072; Null = Not Protecting
    HTPF_ Protecting,      // bit 2066d
    HTPF_Protected,        // bit 2066c
    HTPF_Fabric_Name       // field 2068
} NPIV_PORT_INFO, *PNPIV_PORT_INFO;
PNPIV_PORT_INFO SelectNPIVPorts( )
{
\\ Obtain port lists
    AcquireLock(publicPortListLock);
```

```
myPortList = myPublicPortList;
peerPortList = peerPublicPortList;
ReleaseLock(publicPortListLock);
for port in union(myPortList, peerPortList)
{
   port.HTPF_Protected = False; // We calculate from scratch
   port.HTPF_ProtectedByPort = Null;
   port.HTPF_Protecting = False; // so reset a few parameters
   port.HTPF_ProtectingPort = Null;
}
CalculateNPIVPort(&myPortList, &peerPortList); // SP A determines which ports of its ports
                                               // protect particular matched ports of SP B
CalculateNPIVPort(&peerPortList, &myPortList); // SP A determines which ports of SPB
                                               // protect particular matched ports of SP A
response = union(myPortList, peerPortList);
return response;
}
// For each port in pMyPortList, determine which port within pPeerPortList
// will be be protected by that port. Update both lists accordingly.
// It is expected that this routine is called twice, swapping
// pMyPortList and pPeerPortList on the second call so that the reciprocal
// information in both port lists is updated.
void CalculateNPIVPorts(pMyPortList, pPeerPortList)
{
   for thisPort in pMyPortList
   {
      if((thisPort.HTPF_Enabled) && (!thisPort.HTPF_Protecting)) // Port matching criteria
      {
         FOUND= False;
         for peerPort in pPeerPortList
         {
            // Criteria for used for port matching between protector and protected ports
            if ((peerPort.FabricName == thisPort.FabricName) &&
                (!peerPort.HTPF_Protected) &&
                (peerPort.HTPF_Enabled))
            {
               peerPort.HTPF_Protected = True;
               peerPort.HTPF_ProtectedByPort= thisPort;
               thisPort.HTPF_Protecting = True
               thisPort.HTPF_ProtectingPort = peerPort;
               FOUND=True;
            }
            // Break out/terminate For loop if found a peer port to protect
            if (FOUND==TRUE) break;
         }
      }
   }
}
```

It should be noted that each SP may perform the port matching technique herein independently of the other SP so that each SP may locally determine a set of information such as illustrated in the tables of FIG. 13. In this manner, each SP may have its own set of information as in the tables of FIG. 13 so that any one of the SPs may be the surviving SP and takeover a failing SP's ports using only the surviving SP's own local information (as may be determined prior to the failure by the surviving SP). A portion of port information as illustrated in FIG. 12 may be communicated between SPs and other port information may be determined individually by each SP with respect to its own ports as well as ports of the peer SP in accordance with processing of the port matching technique.

Although the port matching technique is illustrated in connection with SPs each including the same number of two ports, it should be noted that the techniques herein may generally be used in connection with any number of ports. Additionally, the two sets of ports, such as on the two peer SPs, for which port matching is performed (between protected and protecting ports) may each include a different number of ports such as further illustrated in connection with another example in following paragraphs.

Figure 14:
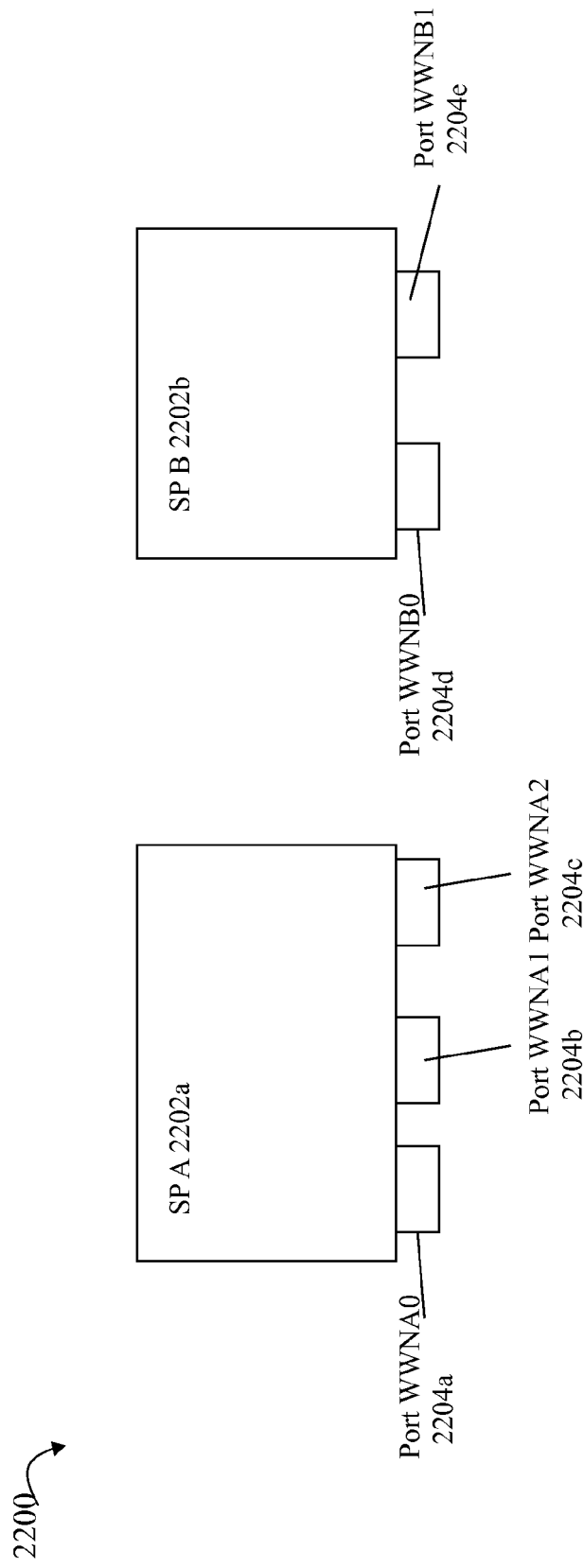

With reference to FIG. 14, shown is an example 2200 of two peer SPs that may be included in an embodiment using the port matching techniques herein. The example 2200 is similar to the example 2000 described above with the difference that SP A 2202a includes 3 ports 2204a-c and SP B 2202b includes 2 ports 2204d-e. The port matching technique processing as described above in connection with FIGS. 11 and 13 may be performed in connection with the peer SPs having ports as in the example 2200 with the additional criteria/provision that a port may be allowed to protect more than one other peer SP port.

Figure 15:
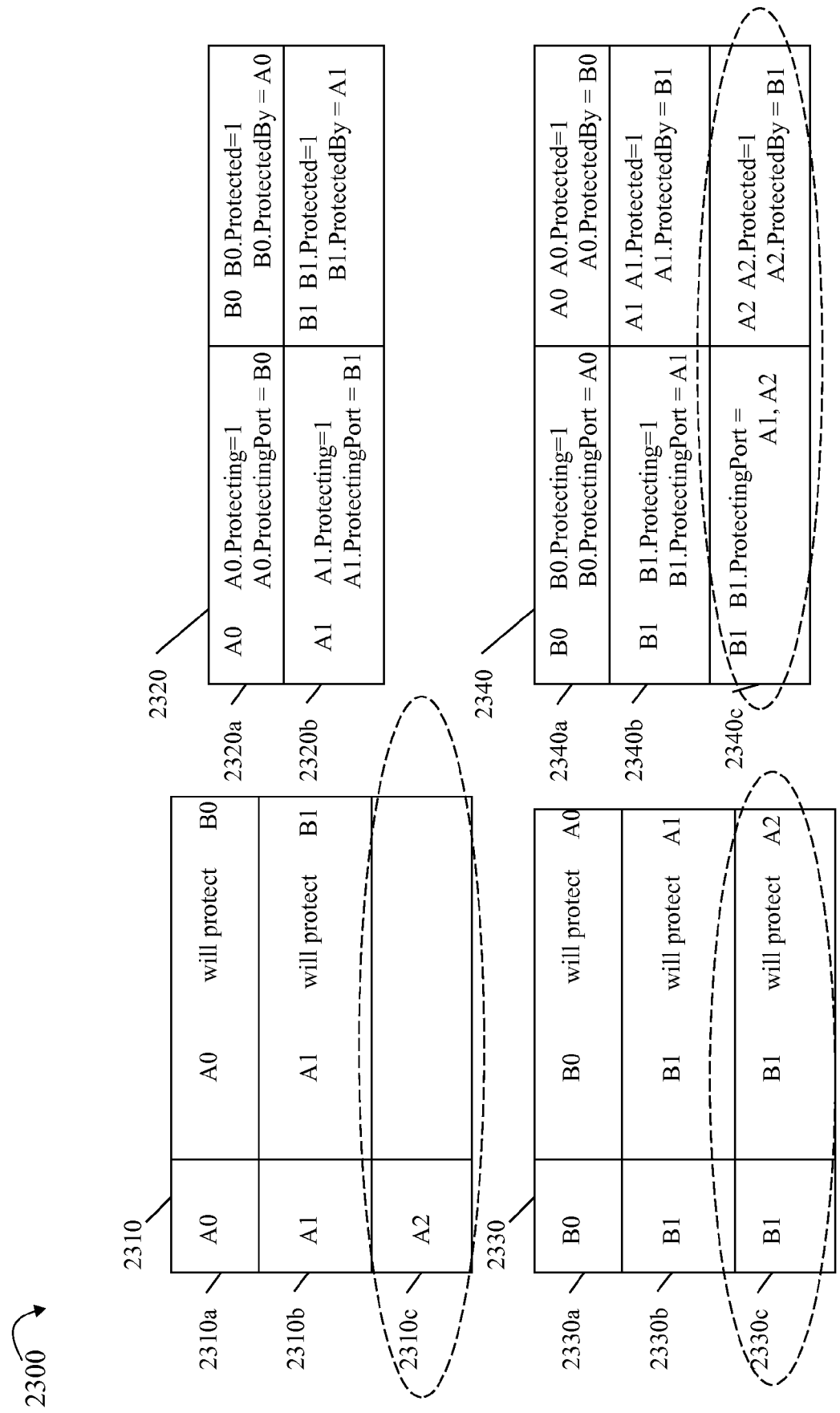

With reference to FIG. 15, tables 2310, 2320, 2330 and 2340 are respectively similar to tables 2110, 2120, 2130 and 2140 of FIG. 13 with the difference that table 2310 includes an additional entry 2310c for port A2 of SP A, table 2330 includes an additional entry 2330c, and table 2340 includes an additional entry 2340c. Entry 2310c of table 2310 denotes that port A2, although enabled and capable of protecting another port of SP B, has not been selected as a candidate to provide such protection of another port of SP B. This is because each port of SP B is protected by a single port of SP A and both B0 and B1 of SP B are accordingly already protected by A0 and A1 (as denoted by 2310a-b). Entries 2330b-c of table 2330 denote that port B1 of SP B protects both ports A1 and A2 of SP A. In this manner, the criteria mentioned above used in this exemplary embodiment may be modified to allow for possibly having a single port, such as B1, protect more than a single peer SP port. Entry 2340c of table 2340 denotes that B1's protecting port field (2072 of the example 2050) includes both ports A1 and A2, A2's protected bit field 2066c is set to 1, and 2's protected by field 2070 identifies port B1.

The foregoing provides some illustrative examples of how port matching may be performed based on a set of criteria. An embodiment may use alternative and/or additional criteria besides that as mentioned above. For example, other criteria may include data transfer limit or maximum bandwidth capabilities of the port, and/or what is the current load on the port such as the current data transfer rate of the target port (e.g., dynamic aspect/attribute that may change over time). The current data transfer rate may be characterized as a workload metric and may be measured based on current I/O requests serviced through the target port. As noted above an embodiment may consider throughput or bandwidth limits/capabilities of the port in criteria used in connection with deciding whether a first port may protect one or more other peer SP ports. For example, port A may have a maximum bandwidth or data transfer capability of 10 gigabits/second (Gb/s). The port matching technique may allow port A to protect only a single peer port which has the same maximum bandwidth or data transfer capability of 10 gigabits/second (Gb/s) as port A.

Rather than use, or in addition to using, the maximum data transfer capabilities of the ports as just described, an embodiment may measure current workload through ports A, B and C and use such current activity levels as a gauge in whether port A's maximum data transfer capability may be able to handle the current workload of all the ports should both ports B and C failover to port A at the same time. For example, if the currently observed or measured workload (e.g., may be average or maximum such value observed for a time period) through ports A, B and C are each 2 Gb/s for a total current workload of 6 Gb/s, it may be determined that port A may protect ports B and C since port A has a maximum data transfer capability of 10 Gbs. Such calculations may allow for possible further increases in current workloads by factoring in an additional "buffer" amount so that the sum of the total current workload and this additional buffer amount must be less than the maximum data transfer capability of port A. Generally, an embodiment may specify criteria which is based on, for example, resources available for use with handling I/O traffic of the port (e.g., memory), port capabilities (e.g., maximum bandwidth/data transfer limits), workload (e.g., which may change over time), and the like.

As described above, each SP may perform the same port matching technique processing to determine a portion of the port information stored locally on each SP. Even though each SP determines failover port matchup independently, both SPs may determine the same matching results since both SPs may execute code performing the same processing. In this manner, the port matching information and also updates to a portion of port state information (e.g., information of tables 2110, 2120, 2130 and 2140 of FIG. 13) as determined independently by each SP do not need to be communicated between SPs for each SP to have the same set of information available thereby obviating the need for additional peer-to-peer messages. Described previously, such as in connection with FIGS. 1-10, are techniques whereby functioning ports of a data storage system virtualize and take over failed ports. The port matching techniques just described may be used in connection with deciding which particular functioning port is matched with taking over for a particular failing port.

The port matching techniques may be performed and managed on the data storage system using various port information such as described herein. Ports may be proactively evaluated to be ready for any subsequent port failover. Planned events resulting in SP and port unavailability (such as upgrading software and/or hardware of an SP) may proactively move or relocate ports of an upgraded SP using port virtualization to a functioning SP during the upgrade. Data storage system port information may be monitored to re-evaluate port matchings for failover purposes. As illustrated by the above examples, port matchings may be flexible in that any port, such as of a first SP, may be suitably matched in accordance with specified criteria with any other port, such as of a second peer SP. When a port of a data storage system fails, the system determines (based on computed port matching using the port matching techniques herein) which surviving port takes over the failed port's responsibilities. The data storage system may select candidate ports based on functional requirements for failover. For example, when using Fibre Channel, ports need to be connected to the same fabric so this may be included in the matching criteria as described above in such an environment using Fibre Channel. Additionally, candidate ports may be selected for better performance during failover using performance characteristics and information available such as related to maximum bandwidth or data transfer rate as also described above.

An embodiment may use the port matching techniques herein at varying levels of granularity. The above-mentioned examples provide for SP-level granularity whereby ports from a first SP failover to another SP. The port matching techniques may also be applied for use with port-level failover granularity whereby there is failover from port to port (whereby both such ports may possibly be on the same SP or different SPs, or on the same data storage system or different data storage systems). Furthermore, the port matching techniques may be made with respect to sets of ports for any number of SPs across one or more data storage systems. The port matching technique may also be applied at an array-level failover whereby ports failover from a first data storage system to another data storage system such as upon failure of the first data storage system, when the first data storage system is upgraded or otherwise unavailable, and the like. The port matching technique may be automatically performed in response to one or more selected trigger event occurrences. For example, the port matching techniques herein may be performed responsive to any Fibre channel link event (e.g., any time there is a login or logout of the switch such as with an SP failure, SP boot, and the like). In this manner, port matching may be re-evaluated automatically and dynamically when ports are configured or reconfigured, based on port states (e.g., as links go up or down), and/or based on changes to port properties such as load, bandwidth, memory, and the like, for optimal performance during failover. The port matching techniques do not require active participation of a failed or failing SP so the port matching techniques may be used in connection with planned as well as unplanned SP and port outages, failures and unavailability.

Figure 16:
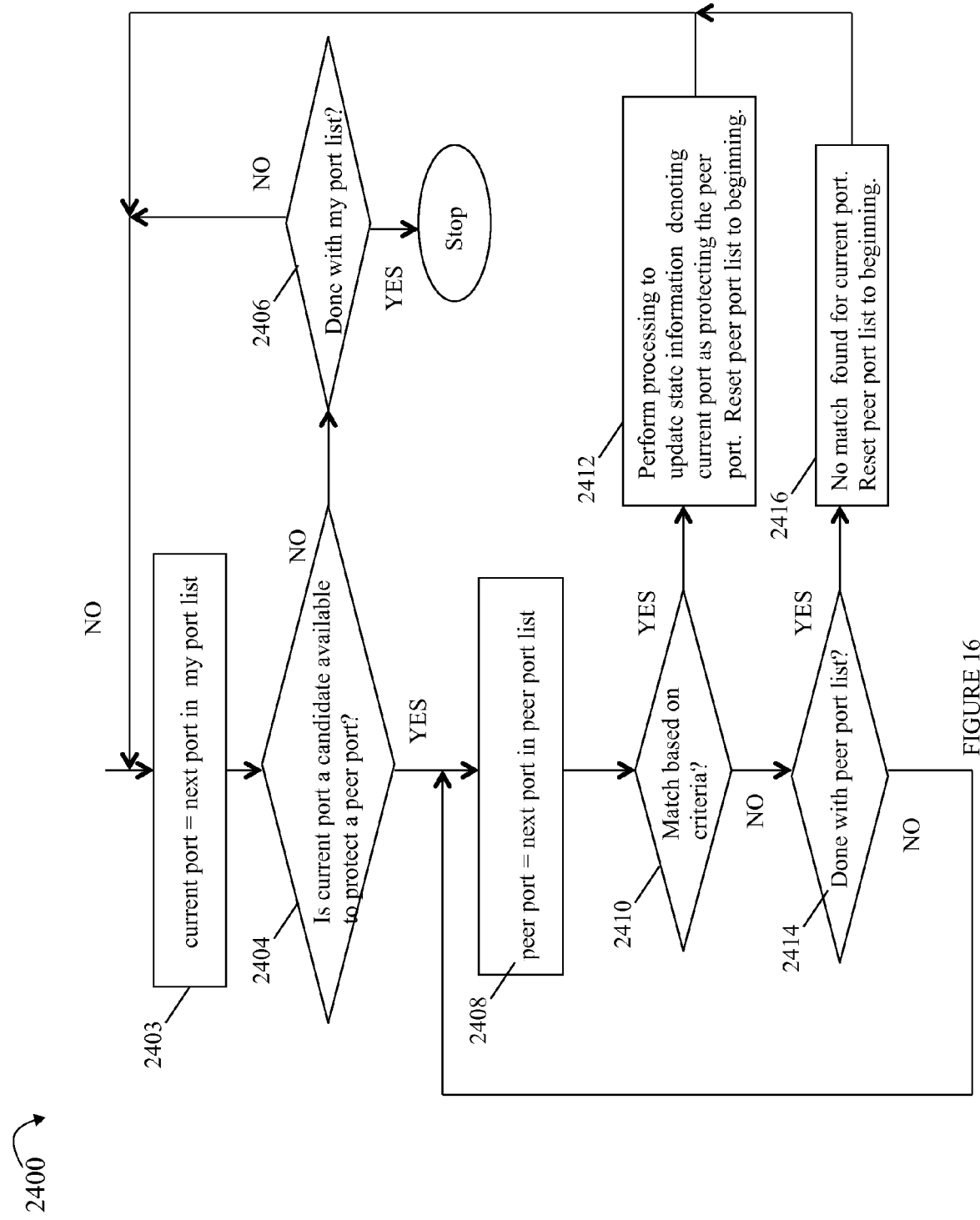
FIG. 16 is a flowchart of processing steps that may be performed in connection with port matching techniques in an embodiment in accordance with techniques herein.

Referring to FIG. 16, shown is a flowchart of processing steps that may be performed in an embodiment in accordance with techniques herein. The flowchart 2400 generally summarizes processing as described above which may be performed twice by each SP upon the occurrence of a trigger condition or event causing processing for port matching to be performed.

For example, SP A may execute the steps of 2400 a first time to determine, for each particular port of SP A, a matching port of the peer SP B that will be protected by the particular port of SP A. This first execution of the flowchart 2400 processing may result in generation of information such as described, for example, in connection with tables 2110 and 2120 of FIG. 13. SP A may then execute the steps of 2400 a second time to determine, for each particular port of the peer SP B, a matching port of SP A that will be protected by the particular port of SP B. This second execution of the flowchart 2400 processing may result in generation of information such as described, for example, in connection with tables 2130 and 2140 of FIG. 13.

At step 2403, current port may be assigned the next port in my port list. "My port list" may be a list of ports of the currently executing SP. At step 2404, a determination is made as to whether the current port is a candidate available for protecting a peer port. Criteria used in connection with the decision of step 2404 may include, for example, the enabled bit 2066b and the protecting bit 2066d as described above where a determination is made at step 2404 with respect to port information for the current port so that step 2404 evaluates to yes/true if current port's enabled bit=1 and current port's protecting bit=0. If step 2404 evaluates to no (indicating that the current port is not available as a candidate for protecting another peer port), control proceeds to step 2406 where a determination is made as to whether all ports in my port list have been processed. If step 2406 evaluates to yes thereby indicating that all ports of the executing SP have been processed, processing stops. If step 2406 evaluates to no, control proceeds to step 2403.

If step 2404 evaluates to yes indicating that the current port is available to protect a peer port, control proceeds to step 2408 where peer port is assigned the next port in the peer port list. The peer port list is a list of peer SP ports. The processing loop beginning in step 2408 traverses the peer port list to try and find a peer port in the peer port list which matches the current port of the currently executing SP. At step 2410, a determination is made as to whether the current port is a match for the peer port based on defined criteria. Step 2410 may include any suitable criteria, some examples of which are described herein, for evaluating whether the current port is a candidate for protecting the peer port in connection with port failover (e.g. upon the occurrence of the peer port failing, the peer port is virtualized by the current port thereby effectively moving or virtually relocating the peer port and its I/O traffic to the current port). If step 2410 evaluates to yes, control proceeds to step 2412 to perform processing to update port state information denoting the current port as protecting the peer port. Additionally, the peer port list is reset to the beginning (so that the next use of peer port list in step 2408 begins from the first entry of the peer port list). Control proceeds to step 2403 with the next port in my port list. If step 2410 evaluates to no, control proceeds to step 2414 where a determination is made as to whether processing of the peer port list is complete. If step 2414 evaluates no, control proceeds to step 2408 to process the next peer SP port. If step 2414 evaluates to yes, control proceeds to step 2416 whereby it is determined that no port match has been found for the current port to protect. Step 2416 includes resetting the peer port list to the beginning and control proceeds to step 2403.

The foregoing port matching technique may be performed in a general first step to determine which ports protect which other ports prior to the need to use such port matching information in connection with performing a port failover. It should be noted that the port matching technique may be performed multiple times in response to trigger event occurrence but is generalized here as a first step to denote determination of port matching information prior to port and/or SP failure. As a second step upon the occurrence of a port and/or SP failure, the port matching information may then be used to determine which surviving physical port provides protection for a failed physical port so that failover processing may be performed whereby the surviving physical port registers as a virtual port for the failed port. As a third step subsequent to performing port failover processing thereby having virtual ports receive host requests, processing may be performed to virtualize responses and behavior as if such responses were sent from the failed SP and its ports rather than the surviving SP and its ports. As a fourth step, the down or failed SP and its ports may reboot to again make the failed SP and its ports operative. In connection with this fourth step, the port matching technique may be re-executed. As in connection with other trigger events causing execution of the port matching technique, the state of the ports/port information associated with the newly booted SP may have changed since prior to the reboot. As such, an embodiment may re-execute the port matching processing using any updated port information for the new SP. As a fifth step, failback processing is performed to switch over or undo the prior failover processing. As a result of the fifth step, I/Os are redirected from virtual ports back to the original physical ports as prior to failover processing. As a sixth step, after completion of failback processing, host requests may be serviced in a normal or usual manner.

In connection with transitioning into the second and fourth steps above, processing will now be described that may be performed to coordinate establishment of the specified I/O redirection (e.g., second step establishing/directing I/O from physical ports to virtual ports and the fourth step re-establishing/redirecting I/O from the virtual ports back to the original physical ports).

As an example, consider a data storage system including two SPs—SP A and SP B—as described above. At the current point in time, assume the data storage system is currently operating in a virtualized mode and that failover processing has been completed in response to SP B failing whereby SP A's ports are currently operating as virtual ports for SP B's failed ports. Thus SP A's ports currently receive host requests directed to SP A's physical ports as well as the virtualized ports of SP B. Now, SP B reboots in order make SP B and its ports available and operative for receiving host requests.

What will now be described is processing that may be performed in connection with performing the above-mentioned failback processing to redirect requests from the virtual paths and ports of SP B (currently being virtualized on physical ports and paths of SP B) back to those physical ports and paths of SP B (as prior to failover processing).

Figure 17:
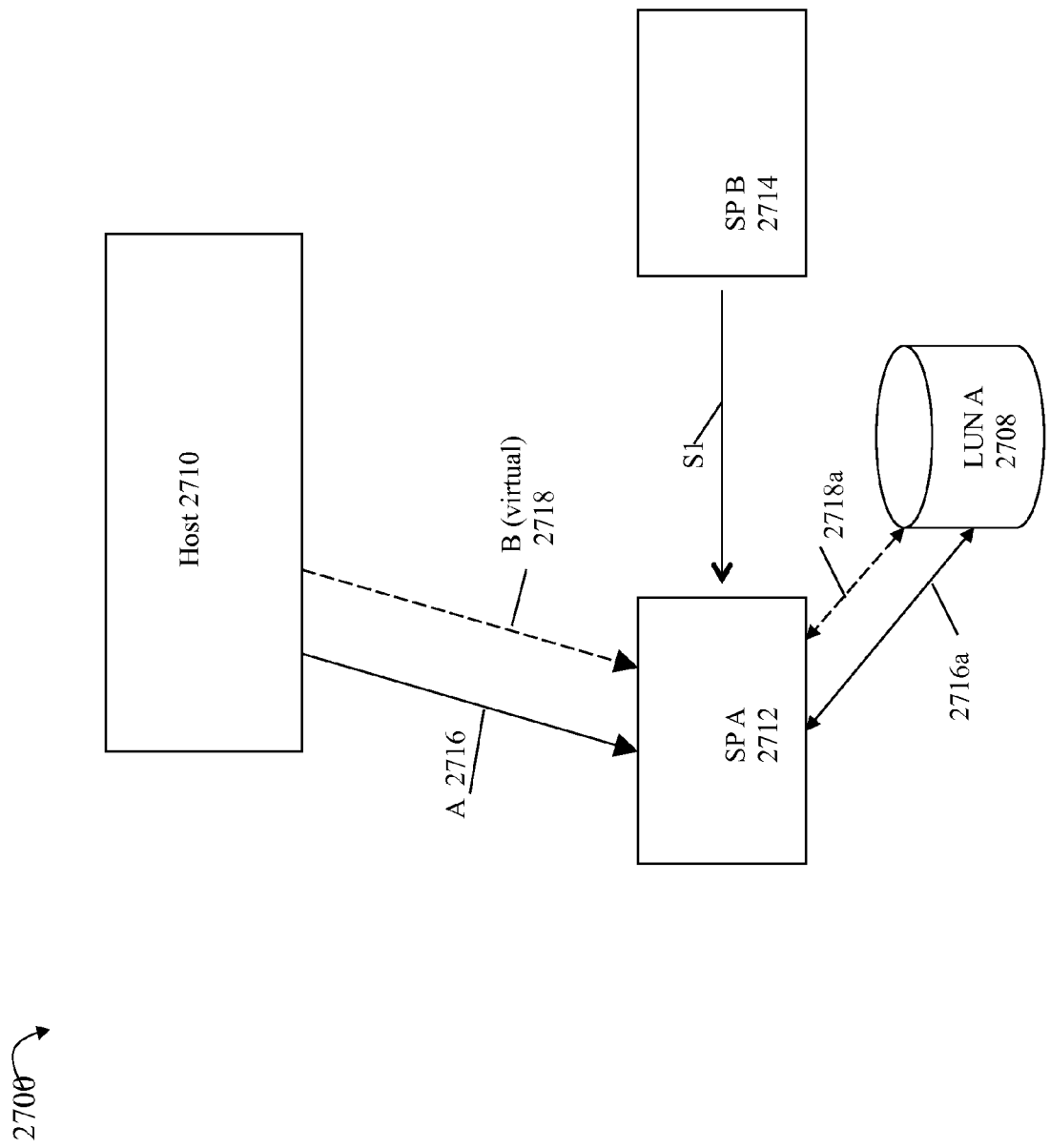
FIGS. 17-21 are examples illustrating quiescing I/Os that may be performed in connection with failback processing in an embodiment in accordance with techniques herein.

With reference to FIG. 17, shown is a first step that may be performed in connection with failback processing in an embodiment in accordance with techniques herein. The example 2700 may represent a snapshot of the system and network prior to performing failback processing when SP B is commencing reboot. The example 2700 includes a host 2710 and two SP's—SP A 2712 and SP B 2714. Elements 2712, 2714 are SPs of a data storage system and other components have been omitted for simplicity of illustration of such techniques. The example 2700 also includes paths 2716, 2718, whereby 2716 collectively represents a set of one or more physical paths between the host 2710 and SP A 2712 (e.g., paths to target ports of SP A 2712). Elements 2718 collectively represents a set of one or more virtual paths to virtual ports for SP B which are hosted/virtualized by physical counterpart paths and ports of SP A 2712. The dashed line for 2718 represents the aspect of the paths directed to SP A 2712 on behalf of SP B being virtual paths in contrast to the solid line 2716 for physical paths to SP A 2712. It should also be noted that intervening network or connection fabric components, such as a switch, between the host and data storage system SPs is also omitted for simplicity but are included in an actual embodiment consistent with other details herein. Element 2716a may represent the data flow in connection with I/O to and from device 2708 for servicing requests received on physical paths 2716 to SP A. Element 2718a may represent the data flow in connection with I/O to and from device 2708 for servicing requests received on virtual paths 2718 for SP B.

As illustrated by S1, SP B commences reboot and sends a message to SP A to begin processing for quiescing I/Os for performing the failback from SP A to SP B. Subsequent figures and description will illustrate additional steps in connection with this quiescing to coordinate the switchover and redirection of I/Os and requests from SP A back to SP B.

Figure 18:
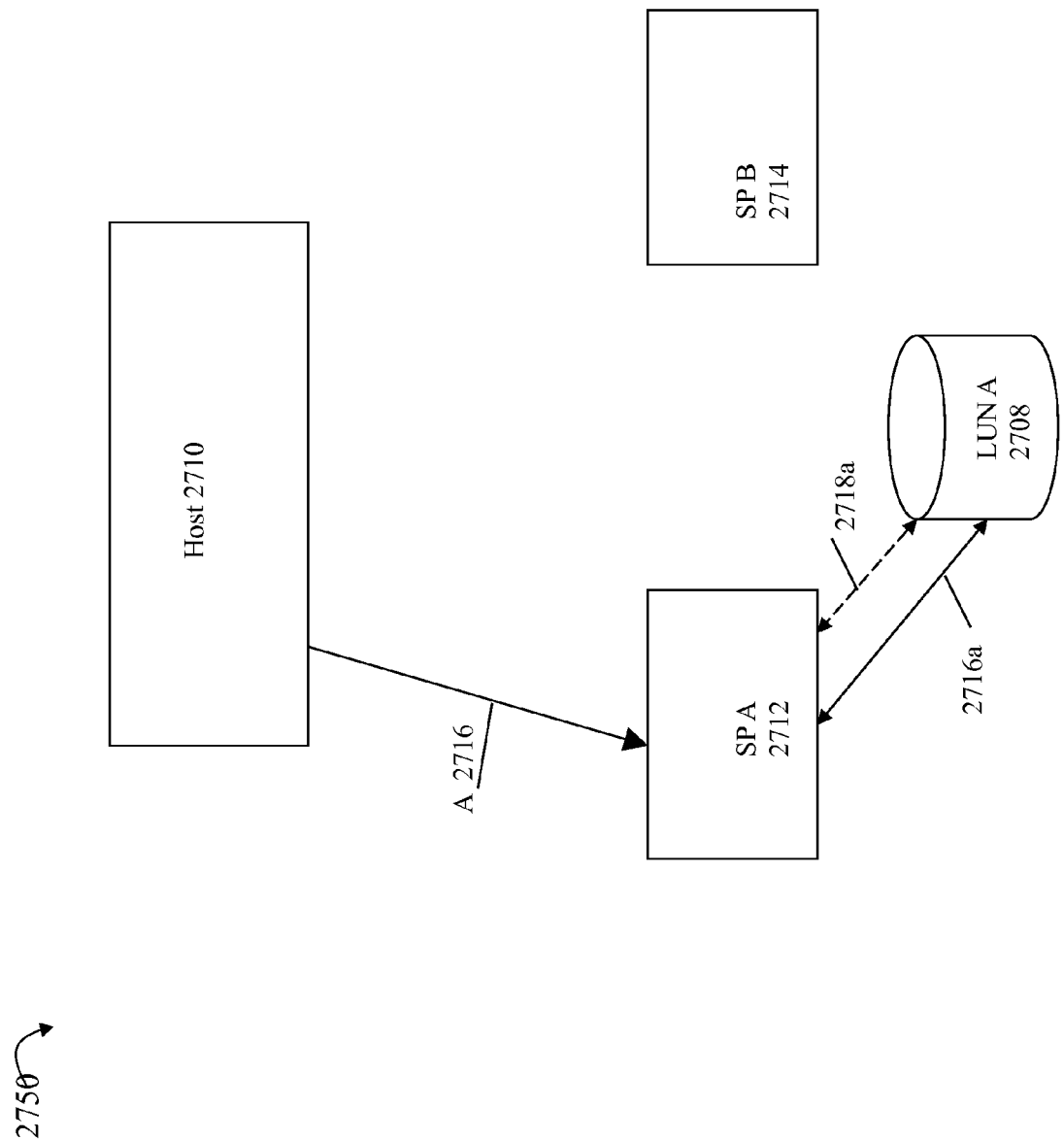

Referring to FIG. 18, shown is an example illustrating a second step of the processing whereby SP A logs out of the switch all login sessions associated with ports being virtualized by SP A for SP B. This is to ensure that subsequent logins to the switch by SP B (e.g., FLOGI commands) will succeed in a subsequent step. As described elsewhere herein, not all switches may handle having both virtual and physical port logins/definitions simultaneously for the same port. To this end, techniques herein may include steps to omit such overlap and simultaneous associations of the same target port WWN with both a virtual port ID and physical port ID by having SP A perform processing to logout such sessions and unregister the virtual port association for target ports of SP B currently being virtualized on physical ports of SP A.

Figure 19:
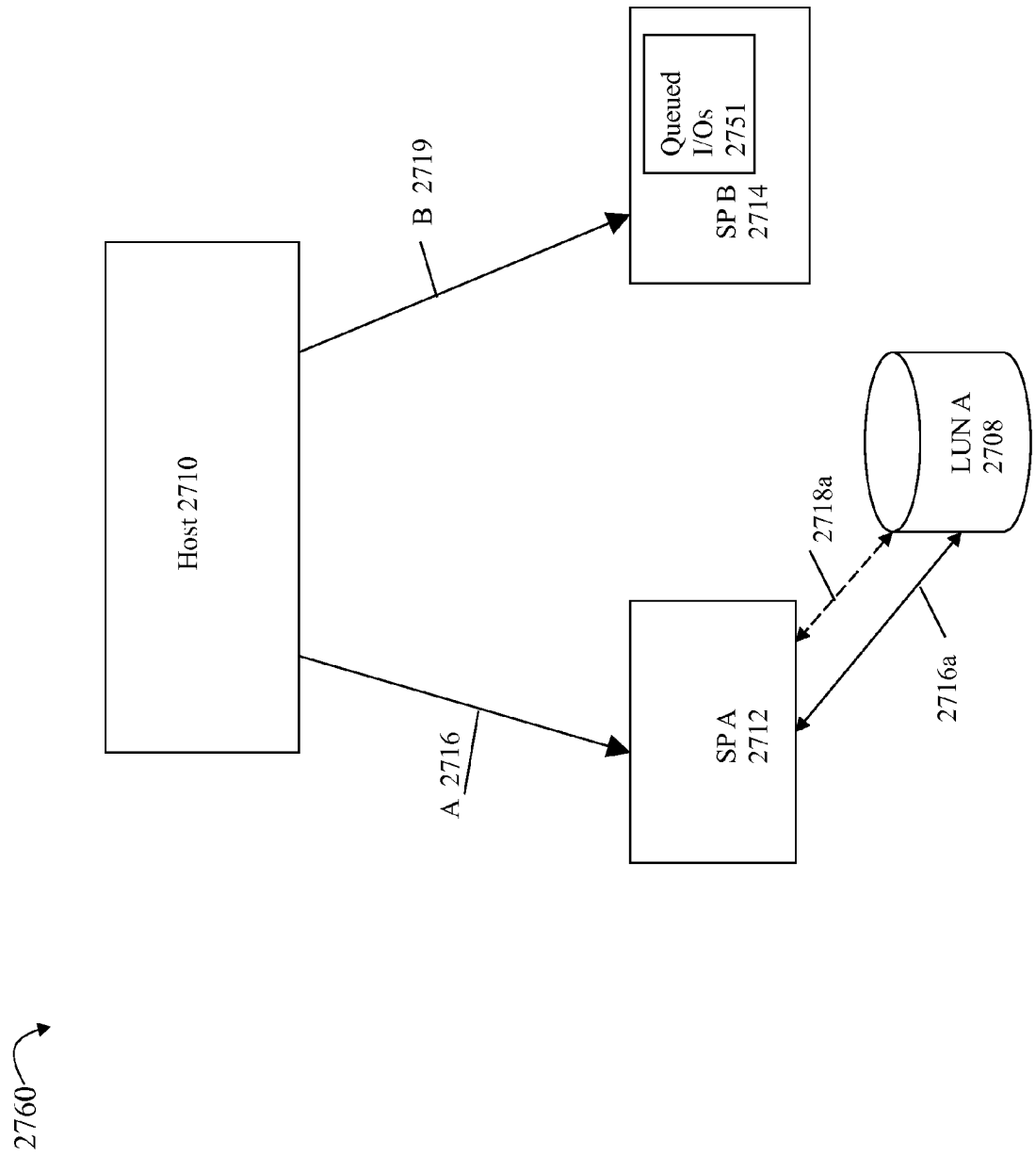

Referring to FIG. 19, shown is an example illustrating a third step of the processing whereby SP B performs logins (e.g. FLOGI commands) to the switch for all its physical ports. Note that B may have to retry this a number of times until SP A has completed logout for all SP B's virtualized ports. Once SP B has successfully completed login for its physical ports and the switch has accordingly updated its database tables, any subsequent I/Os directed to SP B's ports are now sent over 2719 on physical paths to SP B's physical ports rather than to ports of SP A which were acting as virtualized SP B ports. For such I/Os, SP B queues the newly received I/Os (as illustrated by 2751) and does not yet process them until signaled by SP A (in a subsequent step yet to be described) that all pending or inflight I/Os (e.g., outstanding I/Os) on SP A for virtualized SP B ports have been drained (e.g., are no longer pending due to being actively aborted or otherwise completed). To this end, 2718a at this point may represent such pending I/Os for virtual ports of SP B in connection with I/O requests previously received in virtual paths 2718 prior to performing the above-mentioned second step (e.g., FIG. 18).

As a fourth step, processing now waits for the pending or inflight I/Os currently handled by SP A for SP B's virtualized port(s) to complete. Such inflight I/O s being handled by A on behalf of B may be dropped and/or actively canceled or aborted.

Figure 20:
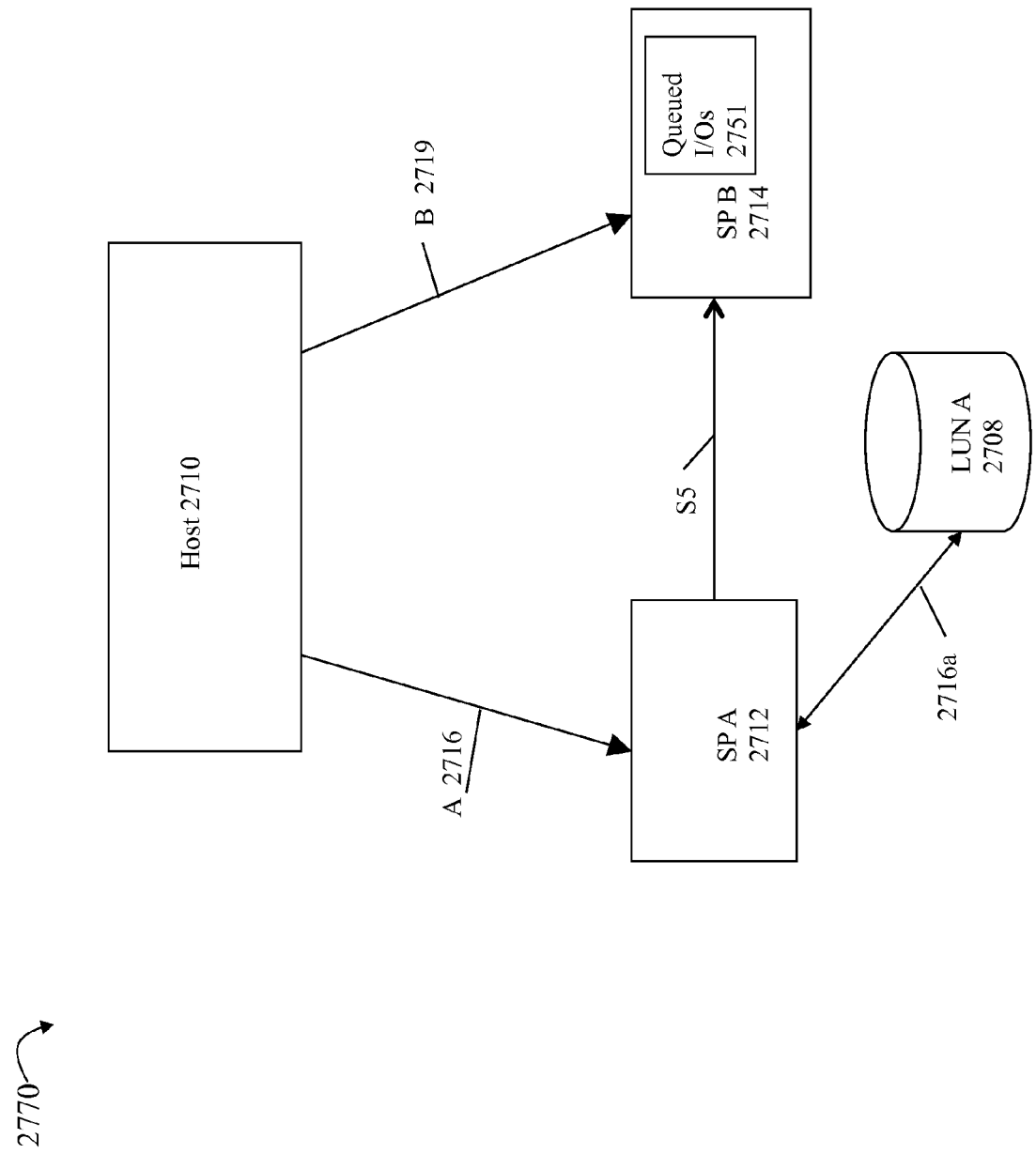

Once all virtualized inflight I/Os being handled on SP A for SP B have been canceled or otherwise completed, in a fifth step as illustrated by FIG. 20, SP A sends a message S5 to SP B (e.g., using inter-SP communication channel) signaling that there are no remaining inflight/pending I/Os for the SP B's virtualized ports (e.g., all such I/Os represented by 2718a have been drained).

Figure 21:
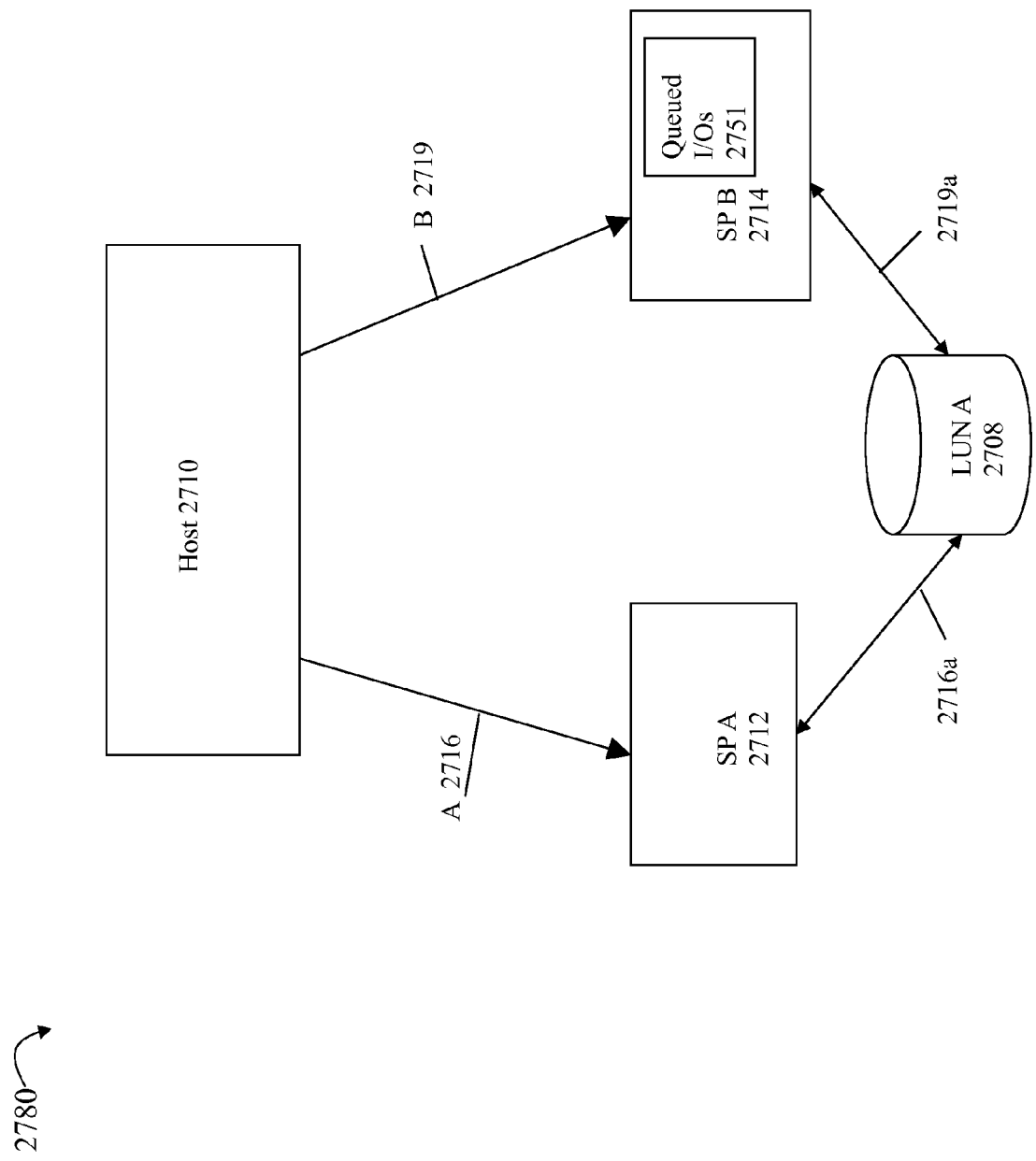

As a sixth step with reference to FIG. 21, SP B may now commence processing pending queued I/Os from 2751 and any subsequently received I/Os over physical paths 2719 to ports of SP B.

It should be noted that with canceled or aborted write I/Os, there is no guarantee about state of write data and whether the write has completed or not. For this reason to avoid any write race conditions leading to undesirable and unexpected results, the above-mentioned quiescing queues I/Os in 2751 until all such pending I/Os for virtual paths of SP B have been drained from SP A.

Figure 22:
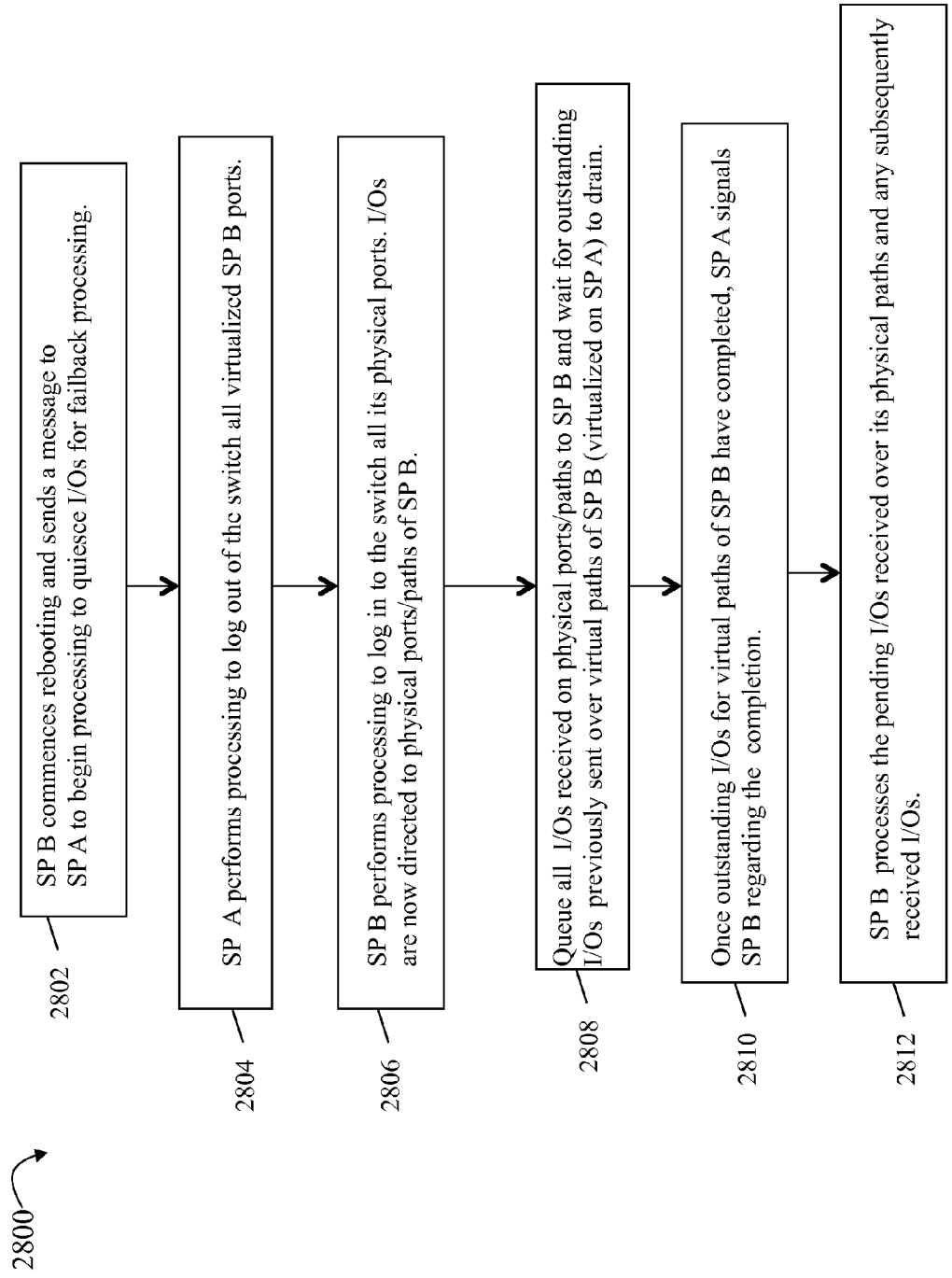
FIG. 22 is a flowchart of processing steps that may be performed in connection with quiescing with failback processing in an embodiment in accordance with techniques herein.

Referring to FIG. 22, shown is a flowchart summarizing processing steps described above to quiesce I/Os in connection with failback processing from SP B to SP A. At step 2802, SP B commences rebooting and sends a message to SP A to begin I/O quiescing in connection with failback processing. At step 2804, SP A performs processing to log out of the switch all virtualized SP B ports. At step 2806, SP B performs processing to log into the switch all its physical ports. After such login has been completed by SP B, all I/Os are now directed to SP B's physical ports rather than its virtual ports (as previously virtualized by physical ports of SP A). At step 2808, all I/O received on physical ports/paths of SP B are queued to wait for outstanding I/Os previously sent on virtual paths of SP B (virtualized on SP A) to drain. In step 2810, once such outstanding I/Os for virtual paths of SP B have completed, SP A signals SP B regarding the completion. At step 2812, SP B processes the pending I/Os queued in step 2808 and also any subsequently received I/Os.

The above-mentioned processing for quiescing and redirecting I/Os may be performed in connection with failback processing as described above returning or failing back to original physical ports of the rebooting SP B (which has previously failed over to SP A whereby SP A is virtualizing ports of SP B). In a similar manner, the above-mentioned quiescing and redirecting I/Os may be performed with differences as noted below for failover processing whereby SP A is taking over I/O and command processing of SP B's ports by virtualizing SP B's ports on SP A. Consider, for example, a case of failover processing whereby SP B is failing over to SP A in connection with an upgrade to SP B or other planned outage for SP B. In response to this planned upgrade to SP B, failover processing may be performed to switchover and redirect I/Os from SP B to virtual paths/ports virtualized on physical paths/ports of SP A. The following summarizes processing that may be performed for quiescing I/Os in connection with failover processing.

Figure 23:
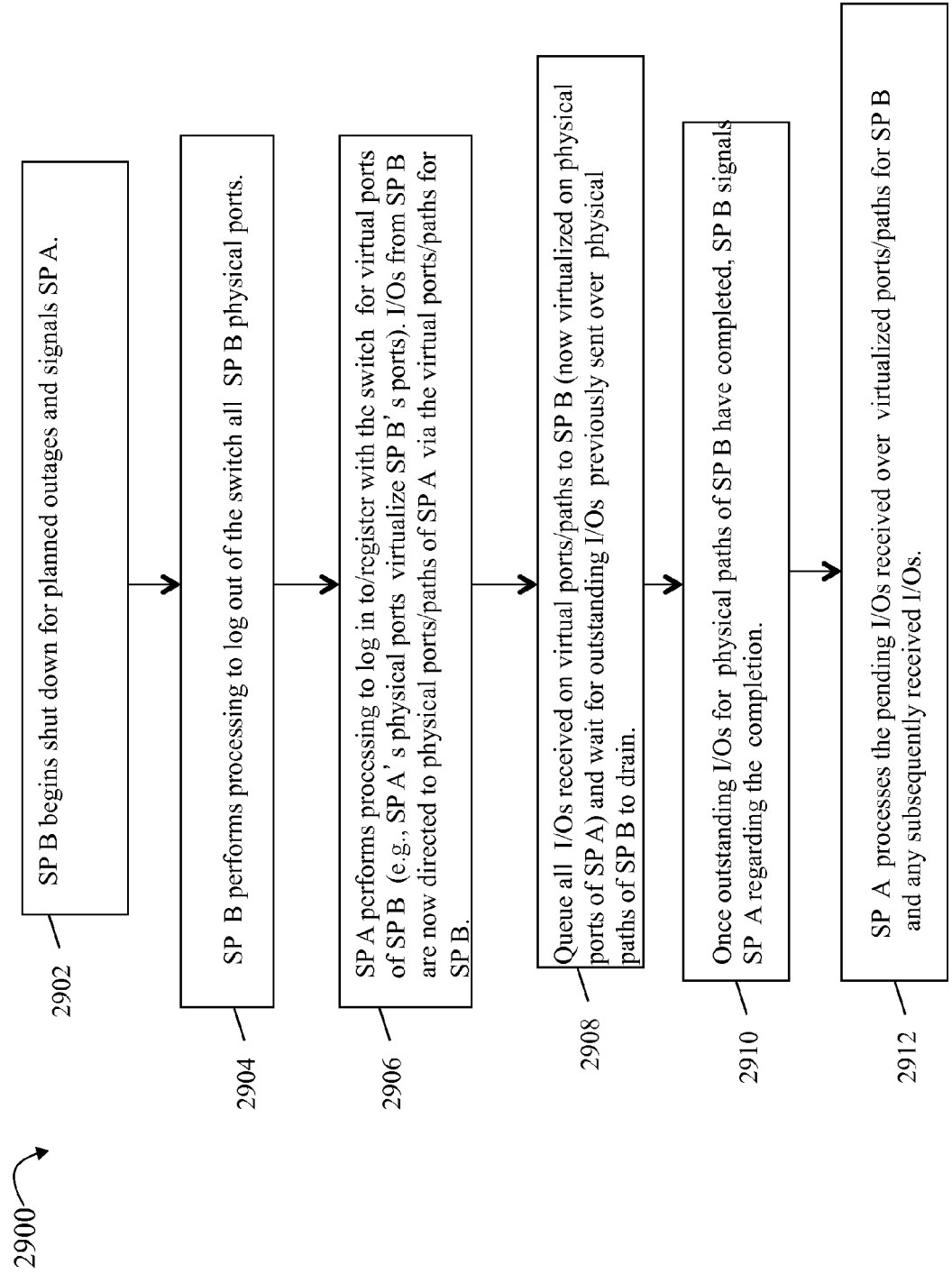
FIG. 23 is a flowchart of processing steps that may be performed in connection with quiescing with failover processing in an embodiment in accordance with techniques herein.

With reference now to FIG. 23, it should be noted that for planned outages such as SP B upgrades, SP B may signal in step 2902 SP A via interprocess communication to commence quiescing because SP B is shutting down. If unplanned outages of SP B as upon SP B failure, SP A may alternatively detect SP B's failure in step 2902 as described elsewhere herein and then commence quiescing. Thus a first step 2902 in the process may be either SP B sending a message to SP A that SP B is shutting down for planned SP B outages, or may be SP A detecting an unplanned failure of SP B.

As a second step in 2904 for planned outages (where SP B has signaled SP A in step 2902), SP B logs out of switch all login sessions for its physical ports (so that FDISC command from SP A for virtual port logins/registrations in a subsequent step will complete). It should be noted that step 2904 may characterized as an implicit logout of SP B's physical ports from the switch in the event that SP B has failed (e.g., existing sessions to SP B are automatically logged out/terminated as result of SP B failure). As a third step 2906, SP A logs into/registers with the switch so that its physical ports virtualized ports of SP B (e.g., using FDISC command, register a physical port of SP A as a counterpart virtual port of SP B thereby effectively virtually relocating ports of SP B to SP A). Once SP A has successfully completed virtual port login/registration for SP B's ports and the switch has accordingly updated its database tables, any subsequent I/Os directed to SP B's ports are now sent to SP B's virtualized ports on SP A. For such I/Os in a fourth step 2908, SP A queues the I/Os and does not yet process them until signaled by SP B that all such pending or inflight I/Os previously received on physical paths/ports of SP B have now been completed or drained. As a fifth step 2910, once all inflight I/Os on SP B have been drained, SP B sends a message to SP A (e.g., using inter-SP communication channel) regarding the state of no remaining inflight I/Os for SP B's physical ports. As a sixth step 2912, SP A commences processing the pending queued I/Os from step 4 and any subsequently received I/Os.

What will now be described are techniques that may be performed in connection with virtualization of an SP for port failover. Described above are techniques for port failover processing whereby functioning data storage system ports virtualize and "take over" other failed data storage system ports. While this virtualizes the hosts' connectivity to a surviving port, this alone is not sufficient for port failover to be sufficiently transparent to the host. In accordance with technique herein, the failed SP that the failed port belongs to is also "virtualized" on the peer SP as well. In other words, the virtualized ports require a virtual SP that represents the failed SP. Such SP virtualization represents the original failed SP as the surviving SP to the host in order to avoid the host recognizing an SP/port failure and avoid having the host perform any failover processing. Rather, in accordance with techniques herein, such failover processing may be performed and managed data storage system-side rather than host-side. Such virtualization techniques provide for SCSI semantics that do report that a failed SP is down and hence I/Os will appear to be serviced by the failed (virtualized) SP, whereas in reality it is being serviced by the surviving SP. During an SP outage, the host is not be made aware of the SP failure and the host will thereby not take any corrective actions, such as moving LUN ownership to the surviving SP.

As a starting point for such virtualization, port failover processing has completed. Without using techniques herein, when an SP, such as SP B fails, the host recognizes the failure and then performs processing to use alternative surviving paths. With techniques herein, when SP B fails, we do not want the host to recognize or be aware of any failed SP B or ports of SP B and also do not want the host to take any action responsive to such failures. In this manner it is desirable for the host to be unaware of any such failures and for the host to believe that it is continuing to communicate with SP B and ports of SP B even though the SP B and its ports are virtualized.

Consistent with the above, the responses, behavior and the like sent by the data storage system in response to communications or requests from the host directed to SP B and its ports should be the same whether SP B and its ports are actually up and running physically, or whether SP B and its ports are virtualized by another second SP and other ports (e.g., where the second SP and other ports are receiving the requests directed to SP B and its ports and performing processing to service such requests on behalf of SP B and its ports). Thus, the second SP and its ports performing processing on behalf of SP B and its ports additionally returns responses as if such responses were sent from SP B and its ports. In this manner, the second SP and its ports virtualize SP B and its ports by emulating or reproducing responses and behavior of SP B and its ports. Thus, the host continues as if communicating with SP B even though it is not.

Using techniques herein, the failover processing and responsibility is handled by the data storage system (rather than on the host) in a manner which may be characterized as transparent and non-disruptive to the host. SP virtualization is performed using information available to each SP (including port information of each SP, such as described elsewhere herein). In one aspect, SP virtualization includes how the SP responds to a SCSI command issued by the host to the SP on a virtualized path. For example, assume a SCSI command is issued to a virtualized port of a failed SP B. In response, the data storage system does not report that the SP B is down and rather reports that SP B (which actually is down/unavailable/failed) is alive/available and thereby the host is not alerted to the state of SP B and its ports being unavailable/failed through the SCSI command response.

As part of port failover virtualization in accordance with techniques herein as described above, when an SP is down, the host may issue an I/O to the port A of the SP. Rather than reject the I/O when the SP is down, the I/O is redirected (through virtualization and port failover processing and described herein) to a virtualized port A at a second different physical port B of a peer SP. Similarly in response to command such as the SCSI inquiry command that may be issued by the host to a failed SP and its port A, the data storage system returns a response consistent with SP and its port A being operative thereby reproducing or emulating behavior and responses as if SP and its port A were actually performing the processing and consistent with SP and its port A having an operative, functional state. Thus, the information returned for such responses is consistent both before and after failover to a virtualized port. Further examples of such commands and responses are described below in more detail.

Figure 24:
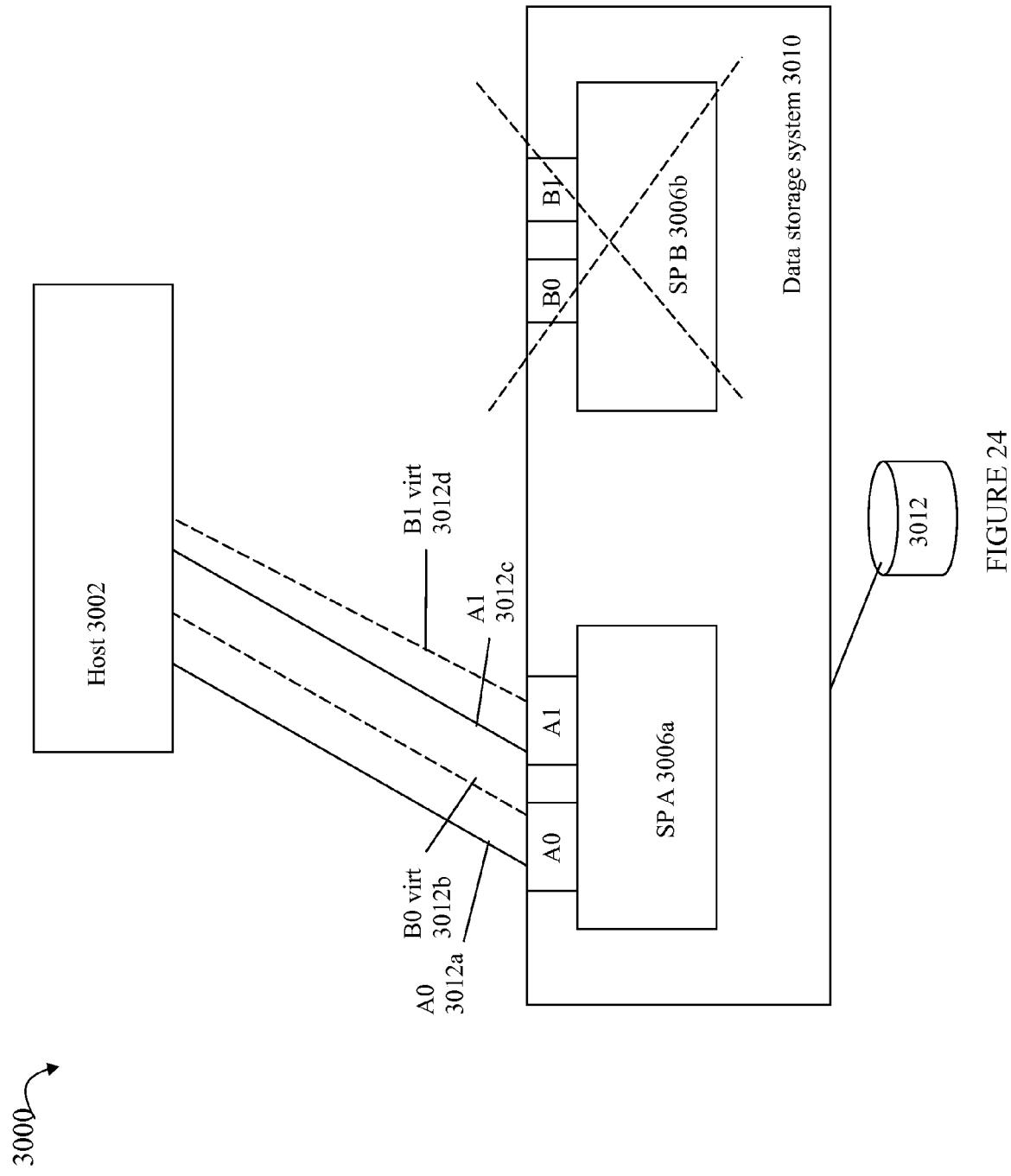
FIGS. 24-28 are examples used in connection with illustrating port and storage processor virtualization as may be performed in an embodiment in accordance with techniques herein.

Referring to FIG. 24, shown is an example illustrating port failover in an embodiment using techniques herein. The example 3000 includes a host 3002, data storage system 3010 and storage for one or more LUNs 3012. The system 3010 includes SPs 3006*a*, 3006*b*. SP A 3006*a* includes ports denoted as A1 and A0. SP B 3006*b* includes ports B0 and B1. Details regarding other components (e.g., such as a switch or other connection fabric) have been omitted for simplicity of illustration but are consistent with other figures and description herein.

I/Os received on ports A0 and A1 directed to a LUN, such as LUN X, having storage provisioned on devices 3012 may be accessed. The example 3000 illustrates a point in time after which failover processing has been performed due to SP B 3006*b* being unavailable due to a failure or planned outage. Assume that the host 3002 recognizes four paths to LUN X from the host to each of ports A0, A1, B1 and B2. After port failover processing has completed as described elsewhere herein, I/Os directed to ports B0 and B1 of SP B are redirected via virtual paths (denoted by dashed lines), respectively, through ports A0 and A1 of SP A. Port B0 is virtualized using physical port A0 and port B1 is virtualized using physical port A1. Thus, I/Os and other commands directed to LUN X at target ports A0 and B0 are received at physical port A0, and I/Os and other commands directed to LUN X and target ports A1 and B1 are received at physical port A1. Element 3012*a* denotes the path to physical port A0. Element 3012*b* denotes the virtualized path to virtual port B0virt (virtualized by physical port A0). In this case, elements 3012*a* and 3012*b* may represent two logical paths to physical port A0 which are actually over a same physical connection to port A0. In a similar manner, element 3012*c* denotes the path to physical port A1. Element 3012*d* denotes the virtualized path to virtual port B1virt (virtualized by physical port A1). In this case, elements 3012*c* and 3012*d* may represent two logical paths to physical port A1 which are actually over a same physical connection to port A1.

What will now be described are various SCSI commands reporting certain information, such as related to SPs, ports, and LUN ownership, which are affected when reporting virtualized values as a result of receiving a command directed to a virtual port whereby that virtual port is virtualized by a peer SP and its physical port. The virtual port may be associated with an SP that may also be characterized as virtualized by the peer SP. In following paragraphs and figures, it should be noted that the information illustrated as included in the response and/or commands may not be complete and is merely illustrative of portions of information that may be virtualized in connection with techniques herein. Furthermore, the commands provided here are not exhaustive and not meant to delineate a complete set of commands for which information may be virtualized. Rather, exemplary commands described herein are illustrative of the manner and type of information that may be virtualized when responding to commands received at virtualized ports on virtualized paths.

It should be noted that the data storage system may track login sessions regarding hosts, such as host 3002, logged into the switch and the particular paths (e.g., initiator and target port) used by the host. The login session information tracked by the data storage system may also denote a target port identifier and whether the target port identifier is associated with a virtualized port or a physical port. Additionally, login session information for a host may be associated with a session identifier. The session identifier may be included in commands from the host as forwarded by the switch to the data storage system. Thus, the data storage system receiving a command may use the session identifier to identify a set of login information including the target port to which the command is directed (whereby the target port may be a physical port identifier or a virtual port identifier as also noted by the login session information).

The standard SCSI inquiry command may be issued by the host to obtain basic information about a target device, such as a LUN of the data storage system. The command may be directed to a particular LUN and sent by the host over a virtualized path whereby the target data storage system port is being virtualized. For example, the inquiry command may be directed to port B0 and is thus received by the data storage system on virtual path B0virt 3012*b*. The command, when received on the virtualized port 3012*b*, reports virtualized information from the perspective of the original physical port B0 and its SP B so that the data is consistent or the same as if the command were received on the actual original physical port B0.

Figure 25:
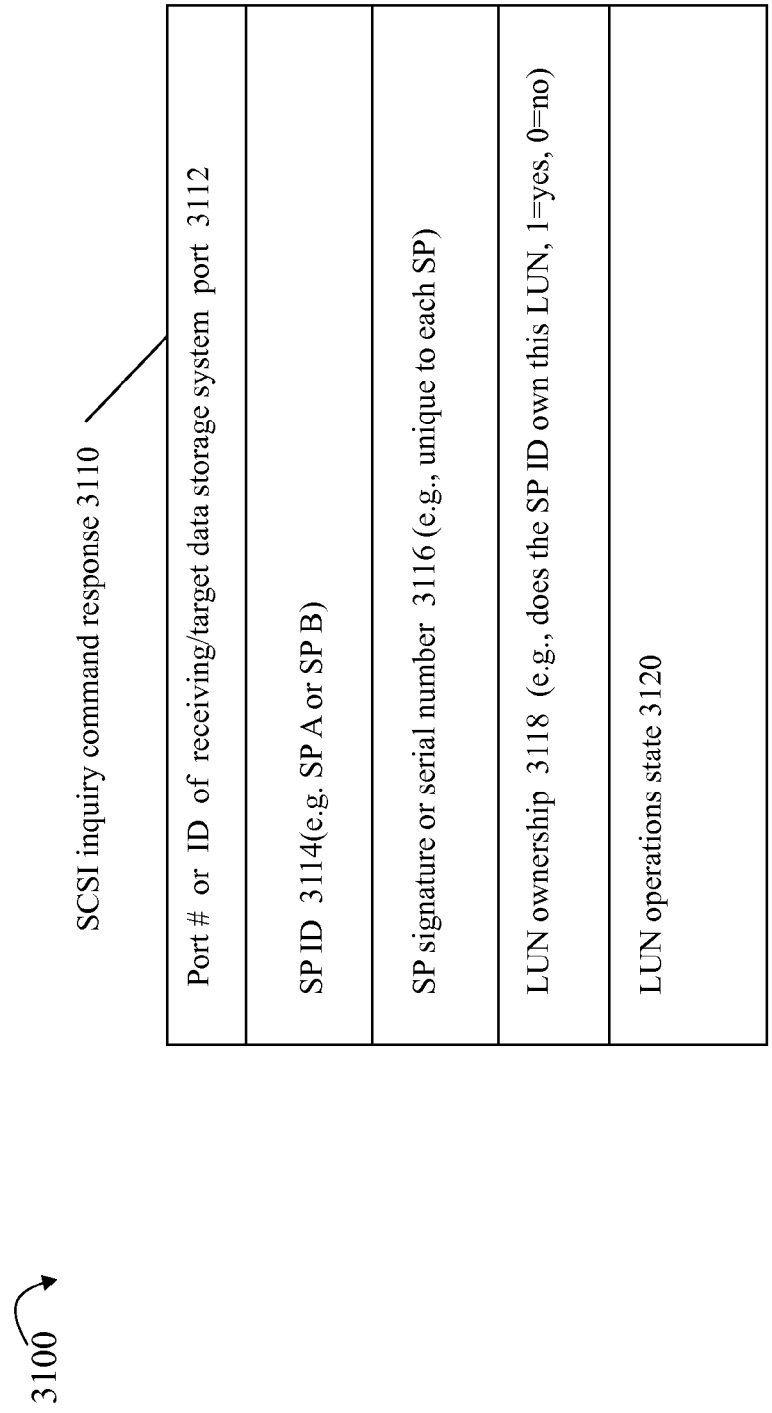

Referring to FIG. 25, shown is an example illustrating information returned in a SCSI standard inquiry response to the host that may be virtualized in accordance with techniques herein. The inquiry response 3110 may include a port number or ID 3112 of the receiving/target port of the data storage system, an SP ID 3114 (identifying the SP including the target port denoted by 3112), an SP signature or serial number 3116 (which is unique to each SP and is the signature of the SP identified in 3114), LUN ownership 3118 (a boolean value denoting whether the SP identified by 3114 is the owner of the LUN to which the inquiry command is directed), and LUN operations state 3120. Field 3120 may be used to report abnormal or transient states affecting I/O to this LUN. In one embodiment, values for 3120 may include 1 denoting that I/O operations are currently rejected because the SP is in the process of shutting down, such as in connection with a planned SP upgrade. Otherwise, 3120 may be 0 denoting normal operations. A virtualized value of 0 will be reported when accessed through a virtual port. When an SP is in the process of shutting down, 1 will not be reported if a first port (which received the command) of the SP shutting down can be failed over to another port (e.g., the first port is protected by another port). If the first port cannot be failed over to another port (e.g. the first port is not protected), then a value of 1 is returned during SP shutdown so that the initiator can initiate a failover (e.g. host-side failover processing).

For this example where the inquiry command is directed to LUN X over path B0virt 3012*b*, a response may be returned to the host identifying the port number or ID for B0 in field 3112, identifying SP B in field 3114, including SP B's signature or serial number in 3116, and denoting in 3118 whether SP B is the owner of LUN X. A virtualized value of 0 will be reported in field 3120 denoting normal processing state.

In a data storage system such as 3010 having multiple SPs, the SPs may have a concept of ownership with respect to a particular LUN in the data storage system. An SP that is deemed an owner of a LUN is the single SP that can perform an operation or I/O against that LUN. There may also be other operations, such as administrative operations, that can only be performed on the owning SP. In the event the owning SP is unavailable, the other peer SP may take over servicing the LUN's I/Os.

The virtualized values returned in response to the inquiry command as described above provide the host with information as if returned by the physical port B0 and its SP B.

Additionally, the SCSI inquiry command may return specific information that varies depending on the particular page code included in the command descriptor block. The page code may be characterized as identifying a particular class regarding the information and/or the entity about which the information is returned. For example, a SCSI inquiry vital product data page command may be issued with a page code of "C0" (unit path report page) which returns the standard inquiry information described above and information regarding the IP (internet protocol) address of the SP identified by 3114. In a virtual path, a virtualized IP address is reported for SP B in this example. As another variation of the SCSI inquiry command, the command may be an inquiry vital product data page 0x83 (device identification page) providing additional information regarding the target port number or id and the target port group (TPG). When received on a virtual port, the target port number or id and the TPG are with respect to the virtual port B0 in this example (e.g., so that the response includes the target port number or id of B0 and the TPG id including B0).

In connection with SCSI commands as known in the art, a Check Condition occurs when a SCSI device needs to report an error. SCSI communication takes place between an initiator, such as a host port of an HBA (host bus adapter), and a target such as a target port of an SP included in a data storage system. The initiator may send a command to the target which then returns a response to the initiator. SCSI commands are sent in a Command Descriptor Block (CDB). At the end of the command, such as an I/O command, the target returns a status code byte encoded with different values corresponding to different status conditions. For example, a status code byte of "00"h (in hexadecimal) may denote success, "02"h may denote a Check Condition or error, and "08"h may denote a busy status. When the target returns a Check Condition or error status in response to a command, the initiator may take further action due to the denoted error state associated with the check condition.

An SP receiving the command may be in a state of shutting down such as, for example, in connection with a planned outage of an SP as when the SP is shutting down for an upgrade. Without use of virtualization techniques herein, the SP receiving the command may return a check condition error status denoting the "shutting down" state of the SP. However, in connection with virtualization of ports and SPs using techniques herein, such a check condition status is not returned.

Rather, a success or normal status regarding the SP is returned in response to receiving a command such as an I/O directed to a port of the SP.

Figure 26:
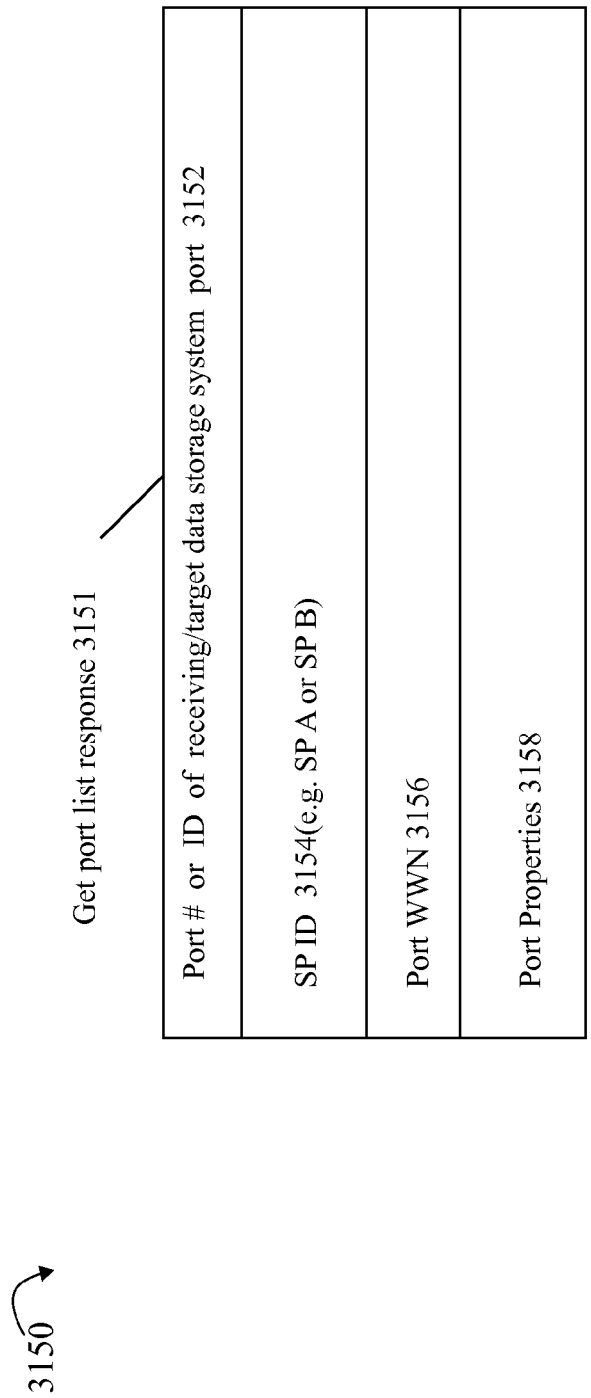

With reference to FIG. 26, shown is an example 3150 of information that may be included in a response 3151 to the vendor unique SCSI command get port list. This command may return general information about available ports including a port number or ID 3152, SP ID 3154, Port WWN 3156, and port properties 3158. Port properties may include, for example some or all of the port information such as described in 2065 of FIG. 12 (e.g., bits 2066). Virtualized values are returned when the command is received on a virtual path/virtual port. For example, if the command is received on virtual path 3012 for virtual port B0, the response may include virtualized values for the virtual port B0 and its virtualized SP B. In this case, the response may include information with respect to port B0 and SP B (e.g., B0's port number or ID in 3152, SP B identified in 3154, B0's WWN in 3156, port properties for B0 in 3158).

The SCSI mode sense commands may be used to obtain information that varies depending on the particular page code included in the command descriptor block. The page code may be characterized as identifying a particular class regarding the information and/or the entity about which the information is returned.

A mode sense command with a page code of 25h denotes a vendor-unique page that provides SP configuration information regarding an SP and its peer SP. This command can be issued to any port and any LUN on the data storage system. Returned is information regarding the SP (of the receiving target port to which the command is directed) and its peer SP. When not reporting virtualized values using techniques herein, values returned for the target physical port and its target SP (receiving the command) may be denoted as THIS SP and values returned for its peer SP may be denoted as PEER SP. Thus, THIS SP may denote the target SP's information to which the I/O is directed.

In connection with techniques herein, virtualized values are returned when the mode sense command with a page code of 25h is received on a virtual path/port. For example, the command may be directed to a LUN over a virtual path with virtualized target port B0 of SP B (wherein the physical port B0 and SP B may be currently down/unavailable). Target port B0 may be virtualized by physical port A0 of SP A. Virtualized values for THIS SP may denote information regarding SP B and may include, for example, SP B's signature and its SP ID. Virtualized values for PEER SP in this case are with respect to SP A (e.g., denoting SP A and SP A's signature).

Figure 27:
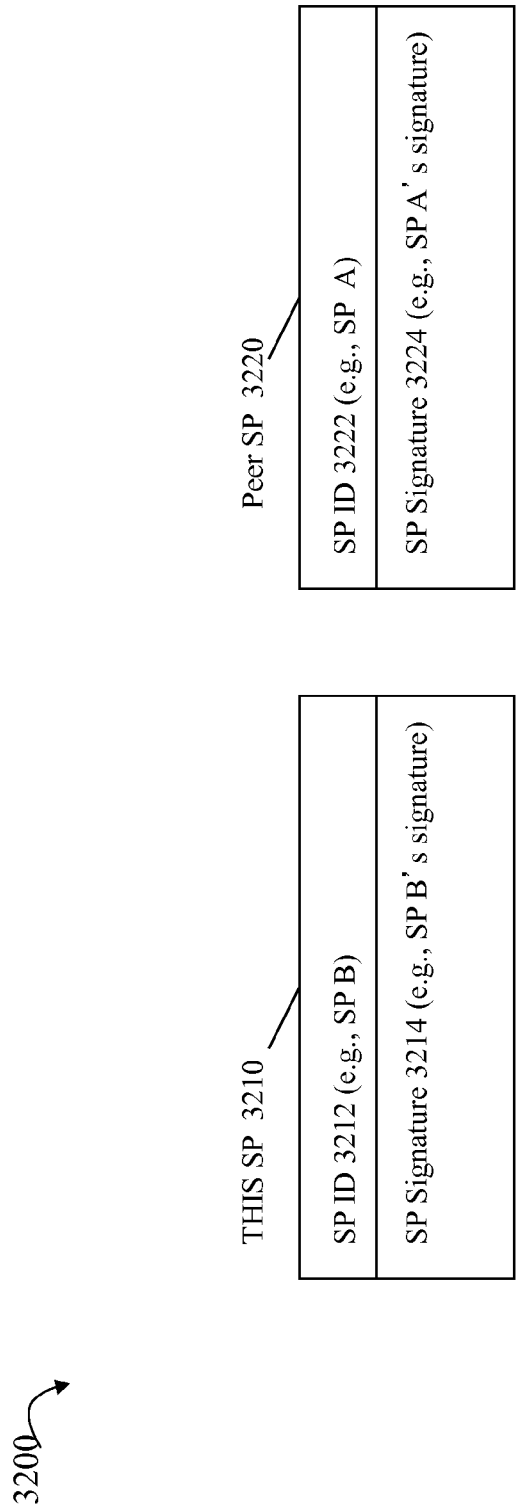

With reference to FIG. 27, shown is an example 3200 illustrating information that may be included in a response to the SCSI mode sense page 25h command in accordance with reporting virtualized values with techniques herein. When reporting virtualized values in this example responsive to receiving the command on virtual path B0virt 3012b, THIS SP 3210 denotes SP B in 3212 as the target SP, THIS SP's signature 3214 as SP B's signature, and denotes the PEER SP 3220 as SP A in field 3222 and the PEER SP's signature 3224 as SP A's signature. In this manner, information about SP B is reported as if SP B is the receiving target SP having a peer SP A even though the actual receiving physical port is associated with SP A.

There are other variations of the mode sense command with different page codes that may also report virtualized information. For example, a mode sense command with a page code of 26h (mode sense SP report) denotes a vendor-unique page that provides information about the SP of the target port including the SP ID. In a manner similar to that as described above, the command may be received on a virtual port B0/virtual path B0virt 3012b. The response to the command may include a virtualized SP ID denoting SP B when accessed from the virtual path 3012b.

As yet another example of a mode sense command, a page code of 0x2B denotes a page that provides the host with specified parameters of a specified LUN (e.g., the specified LUN may be identified in the mode sense command to which the data storage system reports a virtualized response). In particular, the response returned for the command reports on the current ownership of the LUN. The command may be issued identifying a particular LUN, such as LUN X, and may be received over a particular path/port such as path 3012b for virtual port B0. The response to the command may include virtualized LUN ownership information so that the same LUN ownership information is reported before and after port failover (e.g., the same LUN ownership information is reported whether the command is issued over a virtual path or not). The response may include a boolean value of 1 or true if the command identifies a LUN and the command is sent over a path/port of an SP that owns the LUN, otherwise the value is 0. In this example, SP A may be the SP that owns LUN X and the command may be received on a virtualized path/port for SP B (e.g., virtualized path 3012b or 3012d) and return a virtualized value of 0 since the virtual SP B does not own LUN X (thereby mirroring the response information for LUN ownership when the command is received on a non-virtualized path to the physical port B0 or B1 of SP B).

Another SCSI command is the report TPG command that may be issued by the host with respect to a particular LUN over a path such as described above by issuing the command to LUN X over the virtual path 3012b to virtual port B0. The response to the report TPG may return two TPG descriptors, one for each of the SPs A and B with respect to the state of LUN X (to which the command is directed via the command parameters) on that SP. In this example, a single TPG may be defined for all ports of each SP although an embodiment may allow more TPGs to be defined per SP.

In this example, also assume that SP A owns LUN X. If LUN is owned by a particular SP, the path to the LUN is considered optimized when issued to a port of the owning SP. It should be noted that the path may be considered optimized because the SP that owns the LUN may issue I/Os to the LUN. Thus, paths to target ports of the non-owning SP may be considered non-optimized. If an I/O is received over a non-optimized path by a non-owning SP, the I/O may be redirected or forwarded to the owning SP for processing. Thus, a path is considered optimized because processing will be faster as compared to I/O requests received over the non-optimized path due to the above-mentioned redirecting or request forwarding from the non-owning SP to the owning SP. In this example, since the command is directed to virtual port B0, the virtualized response data includes information as if the response was formulated and sent from SP B and physical port B0. Thus, LUN ownership determinations with respect to this report TPG and other commands may be with respect to the virtualized LUN owner which is SP A in this example.

Figure 28:
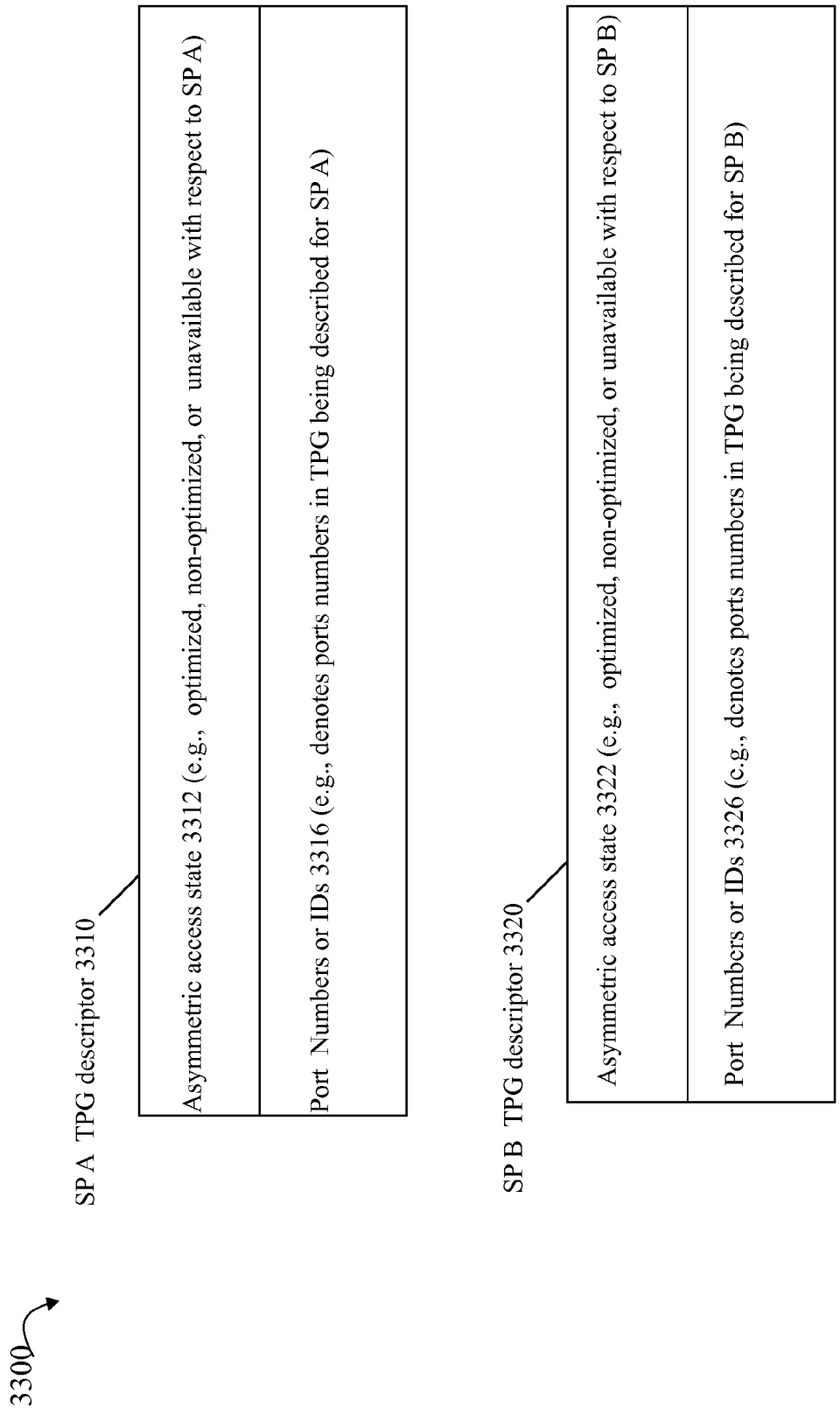

With reference to FIG. 28, shown is an example illustrating information that may be included in a response to the report TPG SCSI command. The example 3300 includes two TPG descriptors—TPG descriptor 3310 for SPA and TPG descriptor 3320 for SP B.

SP A TPG descriptor 3310 includes an Asymmetric access state 3312 (e.g., indicates one of Optimized, Non-Optimized, or Unavailable), and a list of port numbers or ID 3316 (e.g., port numbers or IDs for the TPG of SP A). Field 3312 denotes whether paths to LUN X through target ports of SP A are optimized or not. In this example, 3312 denotes that paths to ports of SP A are optimized since SP A owns the LUN (e.g. thereby indicating SP A is available and also provides an optimized path to the specified LUN of the received TPG SCSI command). Element 3316 may include a list of port numbers or IDs of ports in SP A's TPG (e.g., port numbers or IDs for ports A0 and A1). It should be noted that implicit with indicating a status of optimized or non-optimized for 3312 is an indication that the SP A being characterized is also available, otherwise 3312 would have a value denoting unavailable).

As described below, values included in SP B TPG descriptor 3320 may be virtualized. SP B TPG descriptor 3320 includes an Asymmetric access state 3322 (e.g., indicates one of Optimized, Non-Optimized, or Unavailable), and a list of port numbers or ID 3326 (e.g., port numbers or IDs for the TPG of SP B). Field 3322 denotes whether paths to LUN X through target ports of SP B are optimized or not. In this example, 3322 denotes that paths to ports of SP B are non-optimized since SP A rather than SP B owns the LUN X (e.g. thereby indicating SP B is available and also provides a non-optimized path to the specified LUN of the received TPG SCSI command). In this example, the 3322 has a value of Non-Optimized even though SP B and its physical ports are actually not available. If a value of unavailable is denoted by 3222, the host may perform its own path failover processing. As described herein, the port failover processing from SP B to SP A due to SP B's failure or unavailability is transparent to the host and the failover processing using techniques herein are embodied in data storage system processing rather than host-side. Element 3326 may include a list of port numbers or IDs of ports in SP B's TPG (e.g., port numbers or IDs for ports B0 and B1). As with the field 3312, it should be noted that implicit with indicating a status of optimized or non-optimized for 3322 is an indication that the SP B being characterized is also available, otherwise 3322 would have a value denoting unavailable).

With reference to FIG. 12 and FIG. 28, it should be noted that the state denoted by 3312 and 3322 of the example 2300 may be determined using values of the protected bits 2066c. With respect to SP B and 3322, if port information for all ports of SP B indicates that all such ports are protected (e.g., protected bits 2066c=1 or yes), then the status 3322 is reported as Non-Optimized (e.g. thereby indicating SP B is available and also provides a non-optimized path to the specified LUN of the received TPG SCSI command). Otherwise, the state may be reported as unavailable if all ports (e.g., ports B0 and B1 of SP B) are not protected and the SP B is down or otherwise shutting down. In one embodiment, it may be the case that the state 3322 denotes a state for the entire TPG in that either all ports of the SP and its TPG run as virtual ports, or not. However, as described elsewhere herein, an embodiment may alternatively provide and support availability status on a per port basis (e.g., where the collective state for the TPG may include an individual Optimized/Non-Optimized/Unavailable state per port).

It should be noted that a LUN may be accessible over a set of paths through multiple target ports whereby a first portion of the set of paths and target ports may not be failover capable or such failover capabilities may otherwise be disabled (e.g., port information supported bit 2066a=0, or enabled bit 2066b=0) and the remaining paths and associated target ports may be failover capable and enabled. The first set of paths to the LUN may be characterized as "mixed" or impure with respect to that particular and the techniques herein may not be used in connection with virtualization. In other words, the techniques herein may be used when all paths to the LUN are failover capable and also enabled, and otherwise, the techniques herein may consider all paths to the LUN as not having the failover capability or otherwise having failover disabled.

As described above, the particular commands described herein are not exhaustive but provide some examples of how an embodiment may perform techniques herein for SP virtualization in connection with port failover. From hosts' perspective, the failover and failback will appear like link events, where ports logs out then log right back in. As a result in an embodiment in accordance with techniques herein, pending host requests may be aborted, NACA conditions may be reset, Unit Attentions may be cleared, and SCSI-2 reservations may also be cleared.

As known in the art, some devices support setting the NACA (Normal Auto Contingent Allegiance) bit to a value of one (NACA=1) in the control byte of the SCSI command. ACA is an LU-level condition that is triggered when a command (with the NACA bit set to 1) completes with CHECK CONDITION. When ACA is triggered, it prevents all commands other than those with the ACA attribute from executing until the ACA condition is cleared (e.g., such as by performing a special CLEAR ACA task management function). In connection with techniques, herein, the NACA condition may be cleared during initiator logout and additional processing/segmantics is needed in connection with virtualization techniques herein. During failover, an intiator logout causes NACA conditions to be cleared. When the initiator fails over to the surviving SP's port (as a virtual port), a unit attention may be presented to the host in response to the first I/O thereby indicating that a previous NACA condition is cleared.

In connection with SCSI reservations, failover appears as FC link events to the affected hosts. During failover, the initiator logsout first and then will login to the surviving SP's port. No special processing is needed to handle SCSI reservation during failover. The SCSI reservation semantics prior to failover in normal processing when the initiator logs out and/or into the switch is also applicable during failover.

SCSI-2 Reservations may be characterized as a mechanism for an initiator to reserve a logical unit via a specific path or port. On the data storage system, such SCSI-2 reservations may not be preserved across port logouts. Since failover events appear to the hosts a FC link events, SCSI-2 reservations for the failover ports does not need to be conveyed to the surviving SP. When an initiator logs in to the peer SP during failover, the first IO may receive a Jun. 29, 2000 unit attention thereby providing the host/initiator with an indication that the reservation is lost. Thus, existing SCSI-2 reservation behavior may not be affected due to port failovers.

In an embodiment supporting SCSI persistent reservations, such persistent reservations may be characterized as a mechanism to reserve a logical unit for use by multiple initiators. These reservations are valid for all ports on an array, and may be preserved across initiator failures, hard resets, target resets, and the like. On a data storage system in one embodiment, persistent reservations may be shared across both the SP's. Hence after failover, the failed over initiators experience the same behavior as prior to failover consistent with virtualization techniques herein.

A group reservation command may be a vendor-unique variant of presistent reservation, and provide another mechanism for hosts to reserve LUNs for use by multiple initiators. Like Persistent reservation, Group reservations are valid on all ports on a data storage system. A group reservation may be cleared on a LUN reset or SCSI bus reset. An initiator logout may result in canceling the group reservation. If a logging out initiator is the last member of the group, then the group reservation is also cleared. A failover occurrence may be handled as if the initiator logged out and then logged back in. During logout, registration may be lost and when the initiator logs in to the surviving SP's port, the initiator needs to then re-register. The first I/O after login may receive Jun. 29, 2000 unit attention thereby providing an indication to the initiator that the registration is lost/cancelled.

Figure 29:
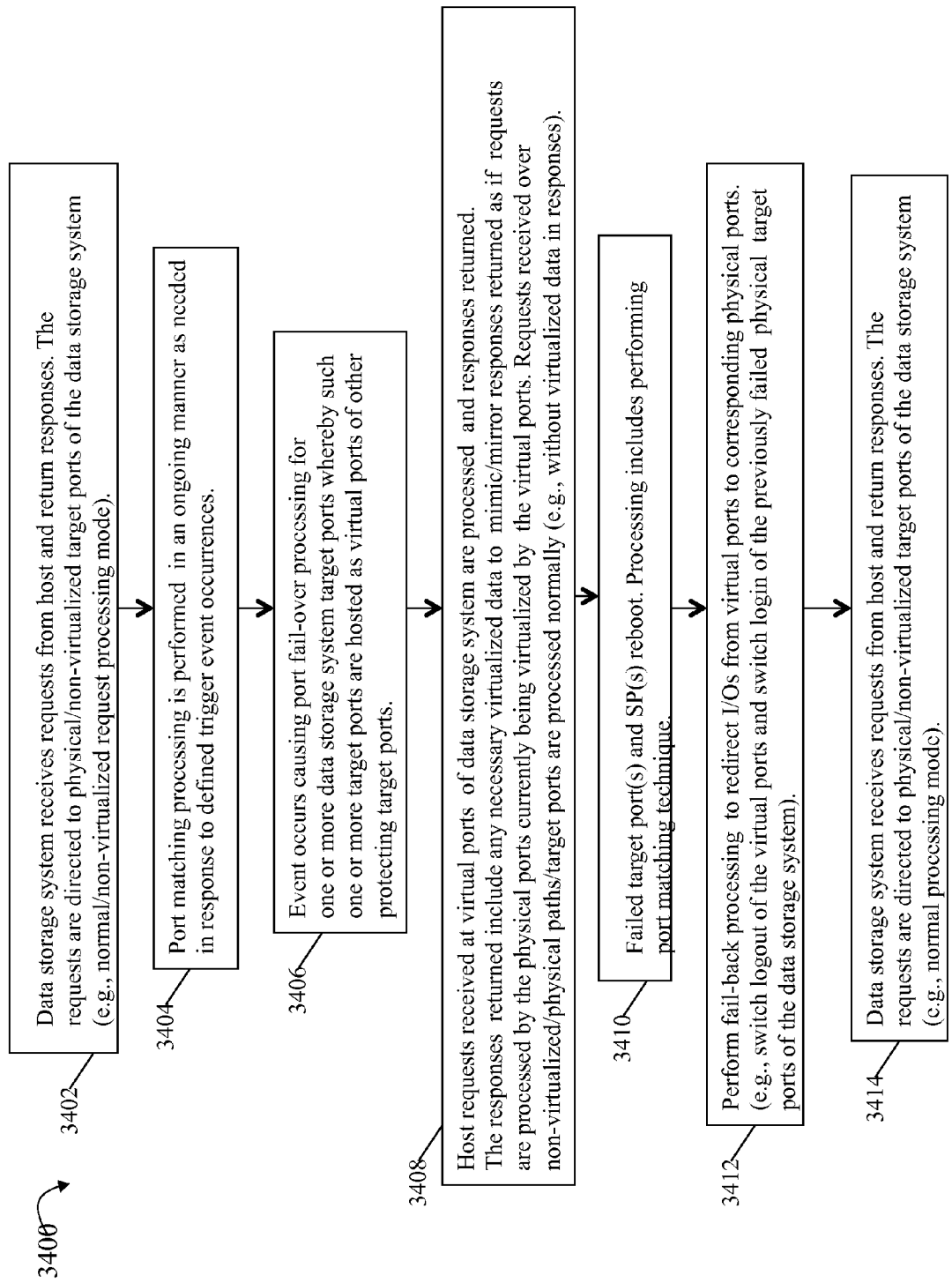
FIG. 29 is a flowchart of processing steps that may be performed in an embodiment using techniques described herein.

Referring to FIG. 29, shown is a flowchart of processing steps that may be performed in an embodiment in accordance with techniques herein. The steps of flowchart 3400 summarize processing described above. At step 3402, the data storage system receives requests from the host and returns responses. In step 3402, the data storage system may be characterized as running in a normal operating or processing state with respect to processing received requests in that requests are routed to physical non-virtualized target ports of the data storage system. Formulation of responses to such requests do not require generating any virtualized values. No data storage system failover processing is in effect. At step 3404, port matching processing is performed in an ongoing manner as needed in response to trigger event occurrences. Details regarding port matching processing are described, for example, in connection with FIGS. 11-16. At step 3406, an event occurs causing port failover processing to be performed for one or more data storage system target ports whereby such one or more target ports are hosted as virtual ports of other protecting target ports. Details regarding step 3406 are described, for example, in connection with FIGS. 1-10. For example, one or more target ports or SPs of the data storage system may be unavailable due to a planned outage (e.g., upgrade) or unplanned outage (e.g., SP failure). At step 3408, the host may send requests to the data storage system whereby at least some of the requests may be directed to virtual ports of the data storage system. The data storage system determines and returns responses to these requests and includes any necessary virtualized data. As described elsewhere herein, the virtualized data facilitates in mimicking or mirroring responses returned to the host (for requests received on virtualized paths/virtualized target ports) so the responses appear to the host as if the requests were processed by the physical ports and SPs currently being virtualized by the virtual ports. Any requests received over non-virtualized or physical paths/target ports are processed normally (e.g., without performing processing to include virtualized data in the responses to such requests). In this manner, the host receives the same response data for commands/requests whether the data storage system has failed over thereby using virtualized paths/ports, or whether the data storage system is currently running in normal mode/non-failover whereby all requests are routed to the data storage system over physical/non-virtualized paths and non-virtualized target ports. At step 3410, the failing or unavailable target ports and associated SP(s) may perform processing to resume operation and the previously failed target port(s) and SP(s) may reboot. Step 3410 processing may include the rebooted SPs performing the port matching technique. At step 3412, failback processing may be performed to redirect requests from virtual ports of the data storage system back to the corresponding previously failed physical ports. Failback processing may be commenced as part of the failed SP rebooting. As described elsewhere herein, failback processing may be generally characterized as processing performed to re-establishing the state of the switch and data storage system as prior to failback processing in order to route requests to the previously failed physical ports which are now operative. Failback processing may include performing steps to "undo" that which was caused by port failover processing of step 3406. Additionally, it should be noted that rebooting the failed SP(s) may trigger failback processing performed by both the booting SP and its peer whereby the booting SP sends a message to its peer SP to perform failback processing as described elsewhere herein. As also described elsewhere herein, failback processing may further trigger link events causing the other SPs to also perform port matching processing. For example, failback processing includes logging out of the virtual target ports on the switch and logging into to the previously failed physical ports of the data storage system. At step 3414, failback processing has completed and the data storage system may receive and process requests in accordance with its normal processing mode whereby requests are directed to physical/non-virtualized paths/target ports of the data storage system and do not require formulating virtualized data.

As described herein, some embodiments operating in accordance with techniques herein may have all ports of a single SP either running non-virtualized/physical, or otherwise having all such SP ports running virtualized. Thus, such embodiments may not allow ports of a single SP or TPG to be split as to whether some are virtualized and some are also running physical (unvirtualized). However, other embodiments in accordance with techniques herein may vary the above-mentioned by allowing ports to be running virtualized or non-virtualized on a per-port basis. Thus, an embodiment may allow a finer granularity of atomicity and allow ports of a same SP to be both virtualized and running physical (e.g., a first physical port of SP A may be virtualized by a physical port of SP B and a second physical port of SP A may not be virtualized (e.g., I/Os are directed to the second physical port of SP A rather than a physical port of SP B virtualizing the second port of SP A).

An embodiment may implement the techniques herein using code executed by a processor. For example, an embodiment may implement the techniques herein using code which is executed by a processor of the data storage system or more generally, any computer system or other component including a suitable processor. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, modifications and improvements thereon will become readily apparent to those skilled in the art. Accordingly, the spirit and scope of the present invention should be limited only by the following claims.

What is claimed is:

1. A method for processing requests comprising:
receiving a request at a data storage system, wherein the request is a command to perform first processing and the request is sent from a client over a virtualized path, the virtualized path including a virtual target port of the data storage system, the virtual target port being a first physical target port that provides a virtualized counterpart port for a second physical target port whereby requests directed to the second physical target port are routed to the first physical target port rather than the second physical target port, wherein the first physical target port receives requests from the client directed to the first physical target port while also receiving requests directed to the second physical target port as a result of the first physical target port virtualizing the second physical target port;

performing said first processing and generating a response to the request, wherein the response includes first information consistent with sending the request over a non-virtualized path to the second physical target port; and sending the response to the client.

2. The method of claim 1, wherein the first processing includes:

determining a first data value that would be included in a generated response to the request if the request had alternatively been received by the second physical target port over a non-virtualized path, said response including the first data value, and wherein a generated response to the request includes a second data value different from the first data value when the request is received over a non-virtualized path including the first physical target port.

3. A method for processing requests comprising:

receiving a request at a data storage system, wherein the request is a command to perform first processing and the request is sent from a client over a virtualized path, the virtualized path including a virtual target port of the data storage system, the virtual target port being a first physical target port that provides a virtualized counterpart port for a second physical target port whereby requests directed to the second physical target port are routed to the first physical target port rather than the second physical target port;

performing said first processing and generating a response to the request, wherein the response includes first information consistent with sending the request over a non-virtualized path to the second physical target port; and sending the response to the client; and wherein the first processing includes:

determining a first data value that would be included in a generated response to the request if the request had alternatively been received by the second physical target port over a non-virtualized path, said response including the first data value, and wherein a generated response to the request includes a second data value different from the first data value when the request is received over a non-virtualized path including the first physical target port, and wherein a second request to perform the command is sent from the client over a non-virtualized path including the first physical target port, and wherein the method further includes:

sending, in response to the second request, a second response to the client, the second request including the second data value.

4. The method of claim 1, wherein the second physical target port is inoperative.

5. The method of claim 4, wherein the first physical target port is associated with a first storage processor and the second physical target port is associated with a second storage processor, the second storage processor being inoperative, and wherein the first storage processor virtualizes the second storage processor.

6. The method of claim 5, wherein the first information is consistent with the request being serviced by the second storage processor rather than the first storage processor.

7. A method for processing requests comprising:

receiving a request at a data storage system, wherein the request is a command to perform first processing and the request is sent from a client over a virtualized path, the virtualized path including a virtual target port of the data storage system, the virtual target port being a first physical target port that provides a virtualized counterpart port for a second physical target port whereby requests directed to the second physical target port are routed to the first physical target port rather than the second physical target port;

performing said first processing and generating a response to the request, wherein the response includes first information consistent with sending the request over a non-virtualized path to the second physical target port; and sending the response to the client, and wherein the second physical target port is inoperative, the first physical target port is associated with a first storage processor and the second physical target port is associated with a second storage processor, the second storage processor being inoperative, and wherein the first storage processor virtualizes the second storage processor, and the first information is consistent with the request being serviced by the second storage processor rather than the first storage processor, and wherein the first information includes first data characterizing the request as serviced by the second storage processor and includes second data characterizing the first storage processor as a peer processor of the second storage processor.

8. The method of claim 7, wherein the second data indicates that the second storage processor is operative.

9. The method of claim 1, wherein the first information identifies the second physical target port, rather than the first physical port, as a port at which the request is received.

10. The method of claim 9, wherein the first physical target port is associated with a first storage processor and the second physical target port is associated with a second storage processor, and wherein the first information identifies the second storage processor as a storage processor associated with the port at which the request is received.

11. A method for processing requests comprising:

receiving a request at a data storage system, wherein the request is a command to perform first processing and the request is sent from a client over a virtualized path, the virtualized path including a virtual target port of the data storage system, the virtual target port being a first physical target port that provides a virtualized counterpart port for a second physical target port whereby requests directed to the second physical target port are routed to the first physical target port rather than the second physical target port;

performing said first processing and generating a response to the request, wherein the response includes first information consistent with sending the request over a non-virtualized path to the second physical target port; and sending the response to the client; and wherein the command is an inquiry command that reports information about a target device and the first information of the response identifies the second physical target port as receiving the request and identifies a second storage processor associated with the second physical target port as servicing the request.

12. A method for processing requests comprising:

receiving a request at a data storage system, wherein the request is a command to perform first processing and the request is sent from a client over a virtualized path, the virtualized path including a virtual target port of the data storage system; the virtual target port being a first physical target port that provides a virtualized counterpart port for a second physical target port whereby requests directed to the second physical target port are routed to the first physical target port rather than the second physical target port;

performing said first processing and generating a response to the request, wherein the response includes first information consistent with sending the request over a non-virtualized path to the second physical target port; and sending the response to the client, wherein the first physical target port is associated with a first storage processor and the second physical target port is associated with a second storage processor that is inoperative, and wherein the command is any of a mode sense command reporting information about storage processor configuration of the data storage system and a second command reporting target port group information representing a state of a target device on each of the first storage processor and the second storage processor, wherein if the command is the mode sense command, the first information identifies the second storage processor as a target storage processor servicing the request and identifies the first storage processor as a peer storage processor of the second storage processor, and wherein if the command is the second command reporting target port group information, the first information includes a first target port group descriptor providing information regarding a first group of target ports of the first storage processor and denotes the first storage processor and first group of target ports as available, and the response also include second information comprising a second target port group descriptor providing information regarding a second group of target ports of the second storage processor and denotes the second storage processor and second group of target ports as available.

13. The method of claim 1, wherein the virtualized path is generated as a result of performing port failover processing responsive to a planned unavailability or an unplanned unavailability of any of the second physical target port and a storage processor associated with the second physical target port.

14. A non-transitory computer readable storage medium comprising code stored thereon for processing requests, the non-transitory computer readable storage medium comprising code for:

receiving a request at a data storage system, wherein the request is a command to perform first processing and the request is sent from a client over a virtualized path, the virtualized path including a virtual target port of the data storage system, the virtual target port being a first physical target port that provides a virtualized counterpart port for a second physical target port whereby requests directed to the second physical target port are routed to the first physical target port rather than the second physical target port, wherein the first physical target port receives requests from the client directed to the first physical target port while also receiving requests directed to the second physical target port as a result of the first physical target port virtualizing the second physical target port;

performing said first processing and generating a response to the request, wherein the response includes first information consistent with sending the request over a non-virtualized path to the second physical target port; and sending the response to the client.

15. The non-transitory computer readable storage medium of claim 14, further comprising code for:

determining a first data value that would be included in a generated response to the request if the request had alternatively been received by the second physical target port over a non-virtualized path, said response including the first data value, and wherein a generated response to the request includes a second data value different from the first data value when the request is received over a non-virtualized path including the first physical target port.

16. A non-transitory computer readable storage medium comprising code stored thereon for processing requests, the non-transitory computer readable storage medium comprising code for:

receiving a request at a data storage system, wherein the request is a command to perform first processing and the request is sent from a client over a virtualized path, the virtualized path including a virtual target port of the data storage system, the virtual target port being a first physical target port that provides a virtualized counterpart port for a second physical target port whereby requests directed to the second physical target port are routed to the first physical target port rather than the second physical target port;

performing said first processing and generating a response to the request, wherein the response includes first information consistent with sending the request over a non-virtualized path to the second physical target port; and sending the response to the client; and wherein the non-transitory computer readable storage medium further comprises code for:

determining a first data value that would be included in a generated response to the request if the request had alternatively been received by the second physical target port over a non-virtualized path, said response including the first data value, and wherein a generated response to the request includes a second data value different from the first data value when the request is received over a non-virtualized path including the first physical target port; and wherein a second request to perform the command is sent from the client over a non-virtualized path including the first physical target port, and wherein the non-transitory computer readable storage medium further includes code for:

sending, in response to the second request, a second response to the client, the second request including the second data value.

17. The non-transitory computer readable storage medium of claim 14, wherein the second physical target port is inoperative.

18. A data storage system comprising:

a first storage processor associated with a first set of target ports;

a second storage processor associated with a second set of target ports;

a non-transitory computer readable storage medium comprising code stored thereon for:

receiving a request at the data storage system, wherein the request is a command to perform first processing and the request is sent from a client over a virtualized path, the virtualized path including a virtual target port of the data storage system, the virtual target port being a first physical target port of the first set that provides a virtualized counterpart port for a second physical target port of the second set whereby requests directed to the second physical target port are routed to the first physical target port rather than the second physical target port, wherein the first physical target port receives requests from the client directed to the first physical target port while also receiving requests directed to the second physical target port as a result of the first physical target port virtualizing the second physical target port;

performing said first processing and generating a response to the request, wherein the response includes first information consistent with sending the request over a non-virtualized path to the second physical target port; and sending the response to the client.

\* \* \* \* \*